US012372310B2

(12) United States Patent
Pedretti-Rodi

(10) Patent No.: US 12,372,310 B2
(45) Date of Patent: Jul. 29, 2025

(54) PROCESS SYSTEM FOR RECOVERING HEAT AND A METHOD FOR OPERATING SAME

(71) Applicant: Synhelion SA, Chur (CH)

(72) Inventor: Andrea Pedretti-Rodi, Bellinzona (CH)

(73) Assignee: Synhelion SA, Chur (CH)

( * ) Notice: Subject to any disclaimer, the term of this patent is extended or adjusted under 35 U.S.C. 154(b) by 347 days.

(21) Appl. No.: 16/301,792

(22) PCT Filed: May 16, 2017

(86) PCT No.: PCT/CH2017/000045
§ 371 (c)(1),
(2) Date: Nov. 15, 2018

(87) PCT Pub. No.: WO2017/197536
PCT Pub. Date: Nov. 23, 2017

(65) Prior Publication Data
US 2019/0154357 A1 May 23, 2019

(30) Foreign Application Priority Data
May 18, 2016 (CH) ..................................... 00640/16

(51) Int. Cl.
*F28F 27/00* (2006.01)
*F24S 20/20* (2018.01)
(Continued)

(52) U.S. Cl.
CPC .......... *F28D 20/0056* (2013.01); *F24S 20/20* (2018.05); *F28D 20/00* (2013.01);
(Continued)

(58) Field of Classification Search
CPC .... F28D 20/0056; F28D 20/00; F28D 20/003; F28D 2020/006; F28D 2020/0082;
(Continued)

(56) References Cited

U.S. PATENT DOCUMENTS 4,094,148 A 6/1978 Nelson
4,265,223 A 5/1981 Miserlis et al.
(Continued)

FOREIGN PATENT DOCUMENTS

DE 10260992 A1 7/2004
DE 102008036527 A1 2/2010
(Continued)

OTHER PUBLICATIONS

International Search Report; dated Aug. 4, 2017; Authorized Officer—Frank Mootz; 3 pages.
(Continued)

*Primary Examiner* — Harry E Arant
(74) *Attorney, Agent, or Firm* — Henry Patent Law Firm PLLC

(57) ABSTRACT

The invention relates to a process system (1, 60, 100, 130, 160, 180, 190) comprising heat stores (3,4,30,61,61a-61d, 62,62a-62d,110,163-165,181-183, 195-198), which are designed to store heat between an upper ($T_o$) and a lower temperature ($T_u$) and to discharge the same again, and comprising a conduit arrangement (L) for the transport of heat-transporting medium to the heat stores (3,4,30,61,61a-61d,62,62a-62d,110,163-165,181-183, 195-198) and away from the latter again, wherein a plurality of operable process units (2,63,63a-63d,161-162, 184-185,191-193) are provided between the upper ($T_o$) and the lower temperature ($T(_u)$ and are each arranged such that the process units are capable of operation between two heat stores (3,4,30,61, 61a-61d,62,62a-62d,110,163-165,181-183, 195-198), through the conduit arrangement (L). This results in a reduced outlay for the production of the process system.

19 Claims, 16 Drawing Sheets

Figure 1:
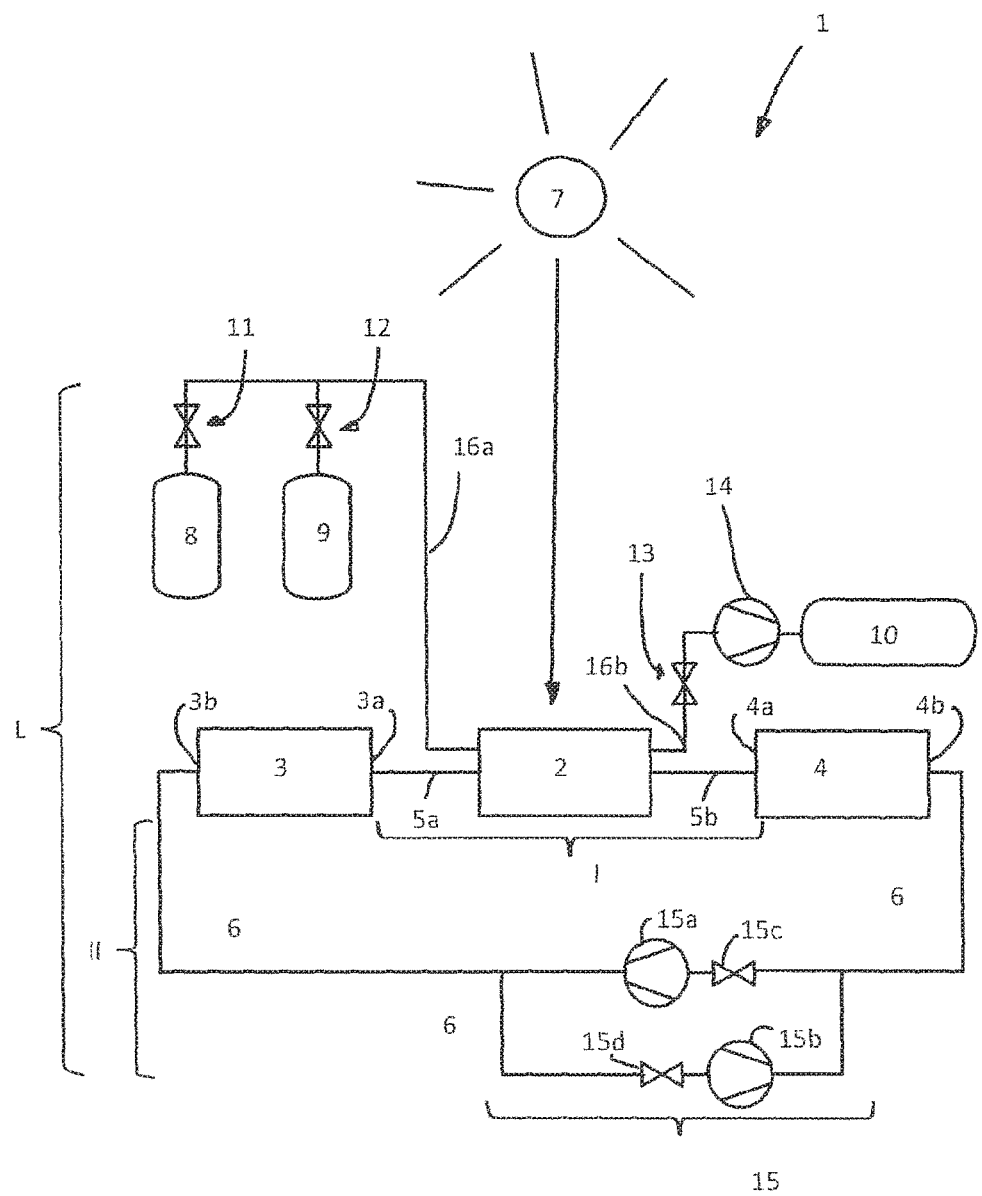

(51) Int. Cl.
*F28D 20/00* (2006.01)
*F28F 27/02* (2006.01)

(52) U.S. Cl.
CPC ............ *F28F 27/02* (2013.01); *F28D 20/003* (2013.01); *F28D 2020/006* (2013.01); *F28D 2020/0082* (2013.01); *Y02E 10/40* (2013.01); *Y02E 60/14* (2013.01)

(58) Field of Classification Search
CPC ........... F24S 20/20; F28F 27/02; Y02E 10/40; Y02E 60/14
See application file for complete search history.

(56) References Cited

U.S. PATENT DOCUMENTS

| | | | |
|---|---|---|---|
| 5,237,827 A | 8/1993 | Tchernev | |
| 2005/0126170 A1 | 6/2005 | Litwin | |
| 2011/0100611 A1* | 5/2011 | Ohler | F01K 3/12 165/104.28 |
| 2012/0080168 A1* | 4/2012 | Hemrle | F28D 20/00 165/104.19 |
| 2013/0049368 A1 | 2/2013 | Kaufmann et al. | |
| 2013/0056170 A1 | 3/2013 | Klemencic | |
| 2013/0307273 A1 | 11/2013 | Afremov et al. | |
| 2014/0299306 A1* | 10/2014 | Bindra | B01D 53/04 165/200 |
| 2015/0345854 A1 | 12/2015 | Brendelberger et al. | |
| 2016/0069218 A1 | 3/2016 | Lenk et al. | |
| 2016/0282056 A1* | 9/2016 | Hanzawa | F28D 20/023 |
| 2018/0106165 A1 | 4/2018 | Barmeier | |
| 2018/0135890 A1 | 5/2018 | Pedretti-Rodi | |

FOREIGN PATENT DOCUMENTS

| | | |
|---|---|---|
| DE | 102010053902 A1 | 6/2012 |
| WO | WO-2011/072410 | 6/2011 |
| WO | WO-2011/072410 A1 | 6/2011 |
| WO | WO-2014/062464 A1 | 4/2014 |
| WO | WO-2016/150461 | 9/2016 |
| WO | WO-2016/162839 | 10/2016 |
| WO | WO-2016/162839 A1 | 10/2016 |

OTHER PUBLICATIONS

Furler, Philipp, "Solar Thermochemical $CO_2$ and $H_2O$ Splitting Via Ceria Redox Reactions," ETH Dissertation No. 21864 (2014) (203 pages).

Furler, Philippe, "Solar Thermochemical $CO_2$ and $H_2O$ Splitting via Ceria Redox Reactions", ETH Dissertation No. 21864 (2014) [202 pages].

Mootz, Frank, International Search Report for PCT/IB2016/052000, Jul. 8, 2016, 3 pages.

* cited by examiner

PROCESS SYSTEM FOR RECOVERING HEAT AND A METHOD FOR OPERATING SAME

The present invention relates to a process system with heat storages that can be operated between an upper and a lower temperature according to the preamble of Claim 1, and a method for cyclic heating and cooling of a plurality of process units according to the preamble of Claim 13.

Processes that take place at different temperature levels are used widely in the art. In this context one process step takes place at an upper temperature and another process step takes place at a lower temperature, or a process step takes place during the temperature change. Many applications are associated with the case in which a chemical reaction takes place with the aid of a catalyst. Then, it is often practical to heat a process unit to an upper temperature range and then cool it to a lower temperature range, and to repeat this temperature change cyclically for continuous production.

One of the many applications is in the field of manufacturing solar fuels, for which the source substances $H_2$ (hydrogen) and CO (carbon monoxide) are formed from $H_2O$ (water) and $CO_2$ (carbon dioxide) when energy—specifically heat at high temperatures—is supplied. A gas mixture containing mainly $H_2$ and CO—as well as other gases—is called synthesis gas, or simply syngas. This syngas is used to produce liquid or gas-phase hydrocarbon fuels.

In an ETH dissertation No. 21864 "SOLAR THERMAL CHEMICAL $CO_2$ AND $H_2O$ SPLITTING VIA CERIA REDOX REACTIONS" by Philipp Furler, an experimental solar cerium reactor is described with which synthesis gas can be produced by irradiation with concentrated sunlight (2865 suns, that is to say thermal radiation of up to 2865 $kW/m^2$).

Sunlight in the concentration described above can be produced on an industrial scale, with the applicant's dish concentrator according to WO 2011/072410, for example, so that the commercial production of synthesis gas using renewable or recoverable energy has become realistic.

According to the ETH dissertation cited above, cerium is reduced in a first, endothermic process step up to an upper temperature of 1800 K, forming oxygen; then, after completion of the reduction reaction the cerium is cooled to a lower temperature of 1100 K and the synthesis gas is produced in a subsequent process step by exothermic reoxidation; in this process, much more endothermic heat is required than the exothermic heat produced. This process can be repeated cyclically for continuous production of synthesis gas; for this, the cerium must periodically be heated consistently to 1800 K and cooled to 1100 K. In order to recover the heat that is removed by cooling, a double-ring structure of a cerium-carrier is suggested. Two counter-rotating, abutting cerium rings with a common axis of rotation are located between the warm zone (1800 K) and the cold zone (1100 K) in such manner that a portion of each ring is located in the warm zone at the 12 o'clock position and an opposite portion is in the cold zone at the 6 o'clock position. A counter-rotating movement of immediately adjacent cerium rings shifts the cold portion of a first cerium ring clockwise towards the warm zone and the warm portion towards the cold zone, and the cold portion of a second Ce ring rotating counter-clockwise also migrates towards the hot zone while the warm portion thereof moves towards the cold zone, and the two cerium rings brush past each other, thereby exchanging heat energy continuously. Accordingly, warm portions cool each other and cold portions heat each other, enabling recovery of a quantity of heat. However, the efficiency of the recovery is low due to the design of the apparatus, and is approximately 25%. The requirements imposed on the design and the stability of counter-rotating, abutting cerium rings—heat transfer, heat dissipation and mechanical costs—are high.

Similar problems to those described above are also encountered in other areas of the prior art when a process unit is to be operated at different temperatures and the heat extracted during cooling is to be recovered.

Improved recovery of heat in a process system including a process unit that is operable between an upper and a lower temperature is described in the as yet unpublished PCT application PCT/IB2016/052000.

The invention according to PCT/IB2016/052000 relates to a process system and a method for operating the system with a process unit that can be operated between an upper and a lower temperature, wherein a first and a second heat storage are operatively connected to one another by a conduit arrangement for a heat-transporting medium, and wherein the process unit is arranged in a first section of the conduit arrangement between the first and second heat storage. Thereby, the heat for cooling the process unit from the upper to the lower temperature can be recovered efficiently. In addition, when stratified heat storages are used all switching elements of the process system can be located on the cold side of the heat storages while only connecting lines need to be provided on the warm side. The process system is preferably operated cyclically, with a flow direction to be cyclically reversed for the heat transporting fluid.

The object of the invention is therefore to further develop a process system with a process unit which is operable between an upper and a lower temperature so that heat can be recovered more effectively using a simplified, inexpensive process system. The process system should also be usable inter olla for temperatures above 1000 K, so that synthesis gas may be produced, for example.

This object is solved with the features of Claims 1 and 13. Since several process units are provided, the total volume of heat storages required per process unit may be reduced, wherein for example the complexity of the circuitry for each heat storage may be reduced, and particularly the outlay for delivering the heat in the upper temperature range from another heat source.

Preferred embodiments of the present invention have the features of the dependent Claims 2 to 12 and 14 to 18.

Figure 2:
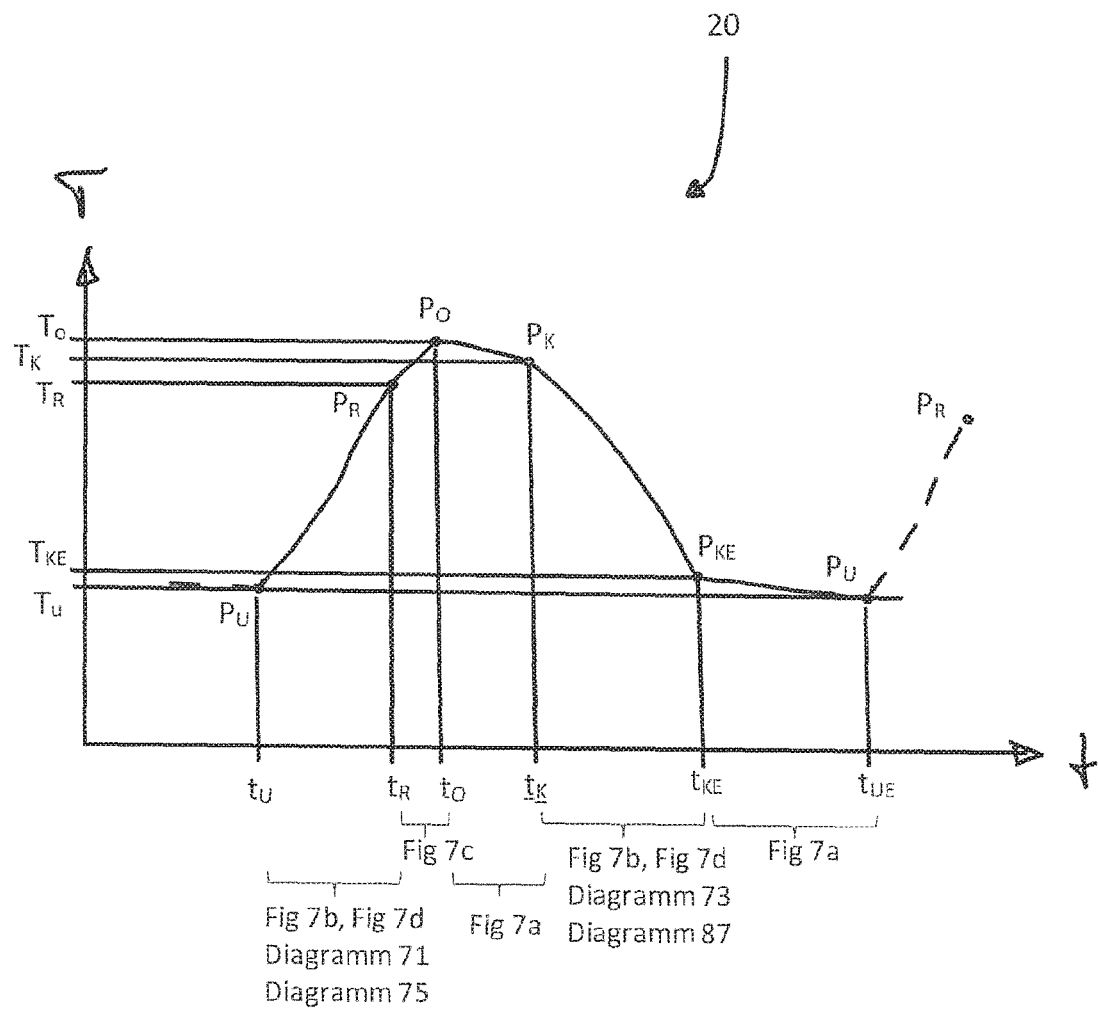
Figure 3:
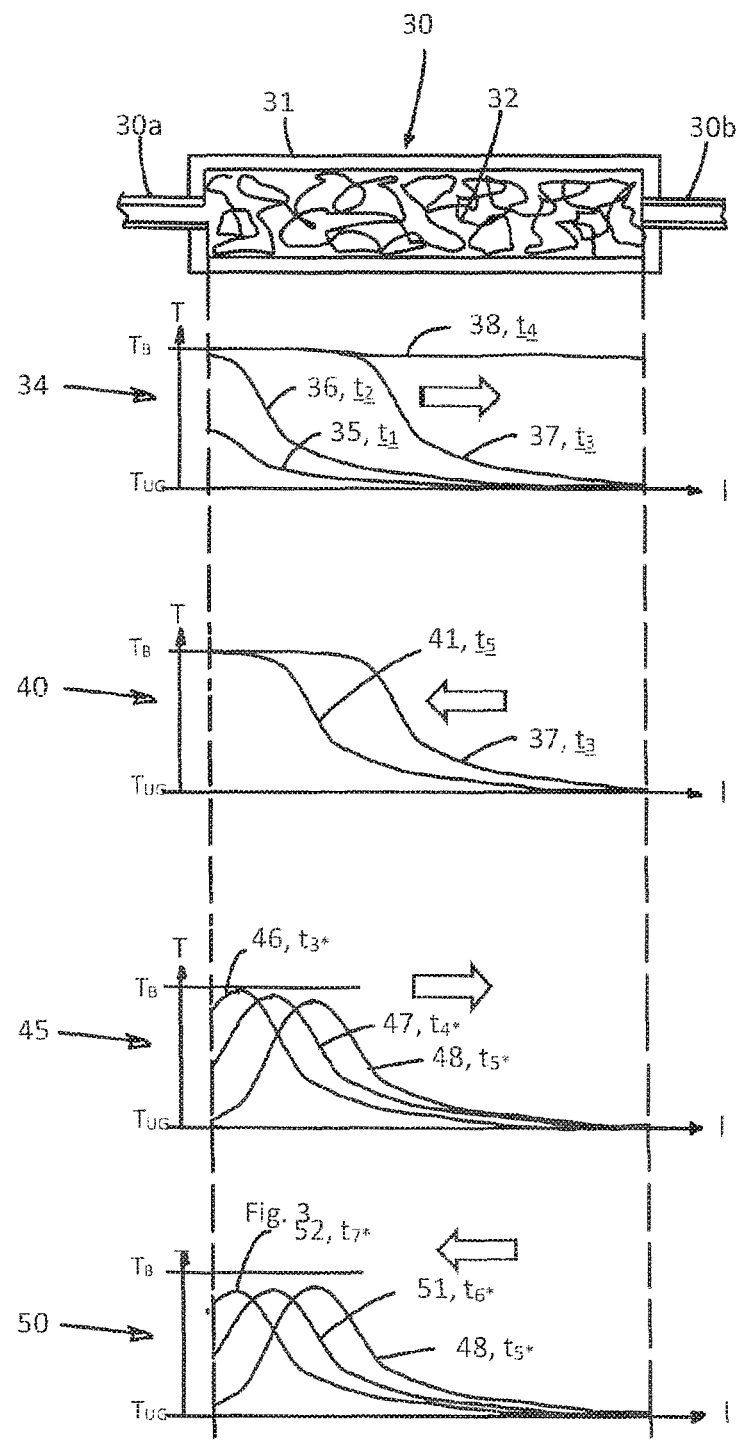
Figure 4:
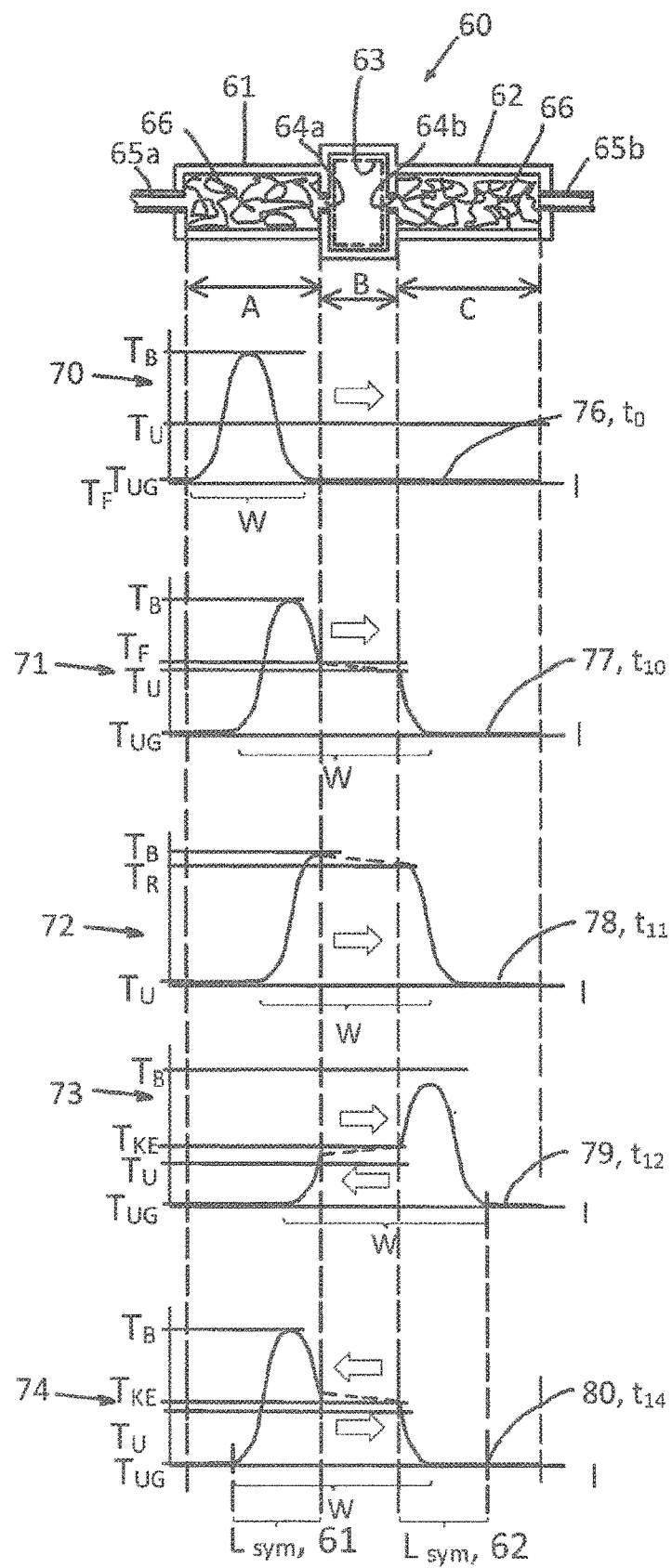
Figure 5:
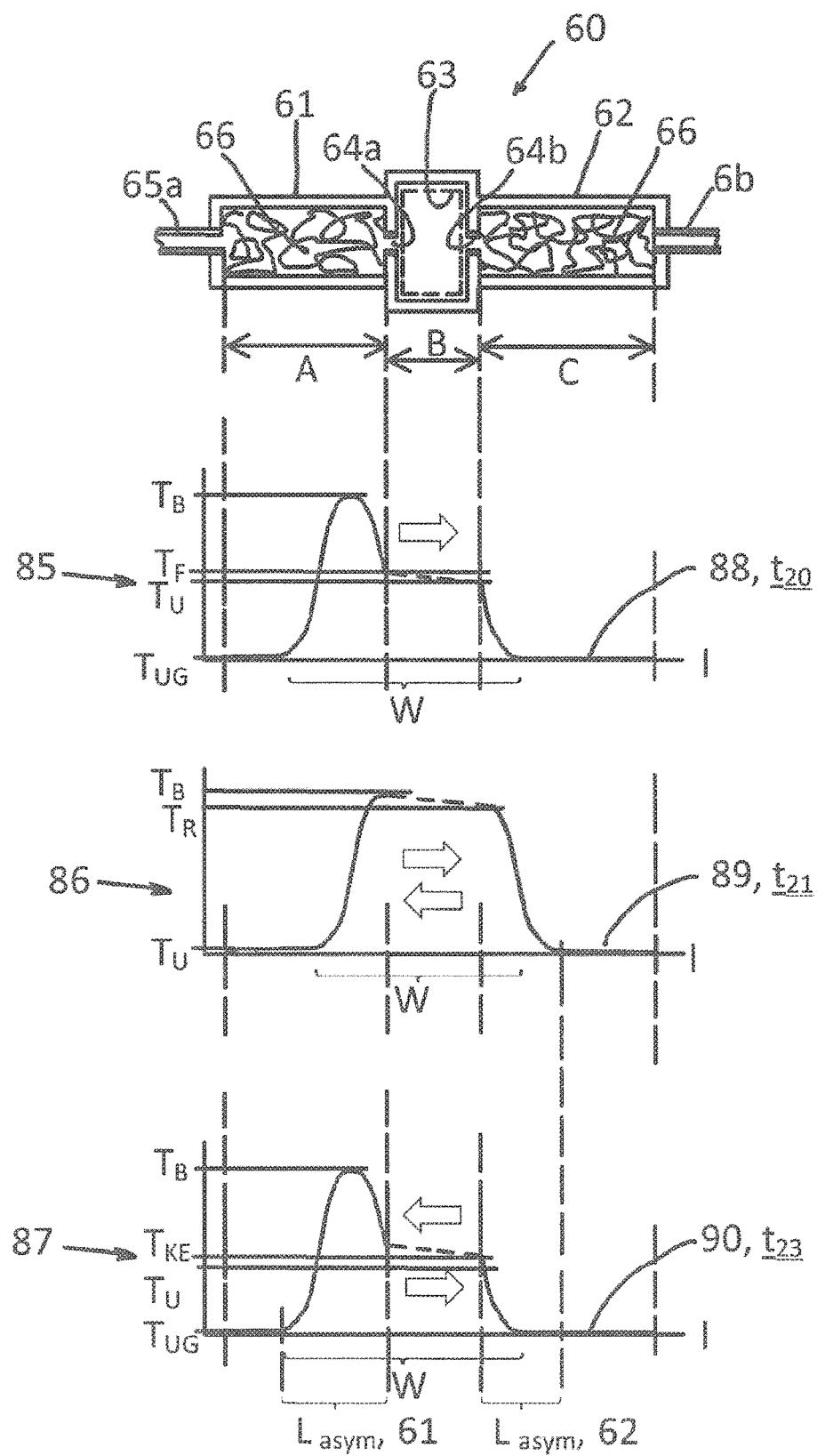
Figure 6:
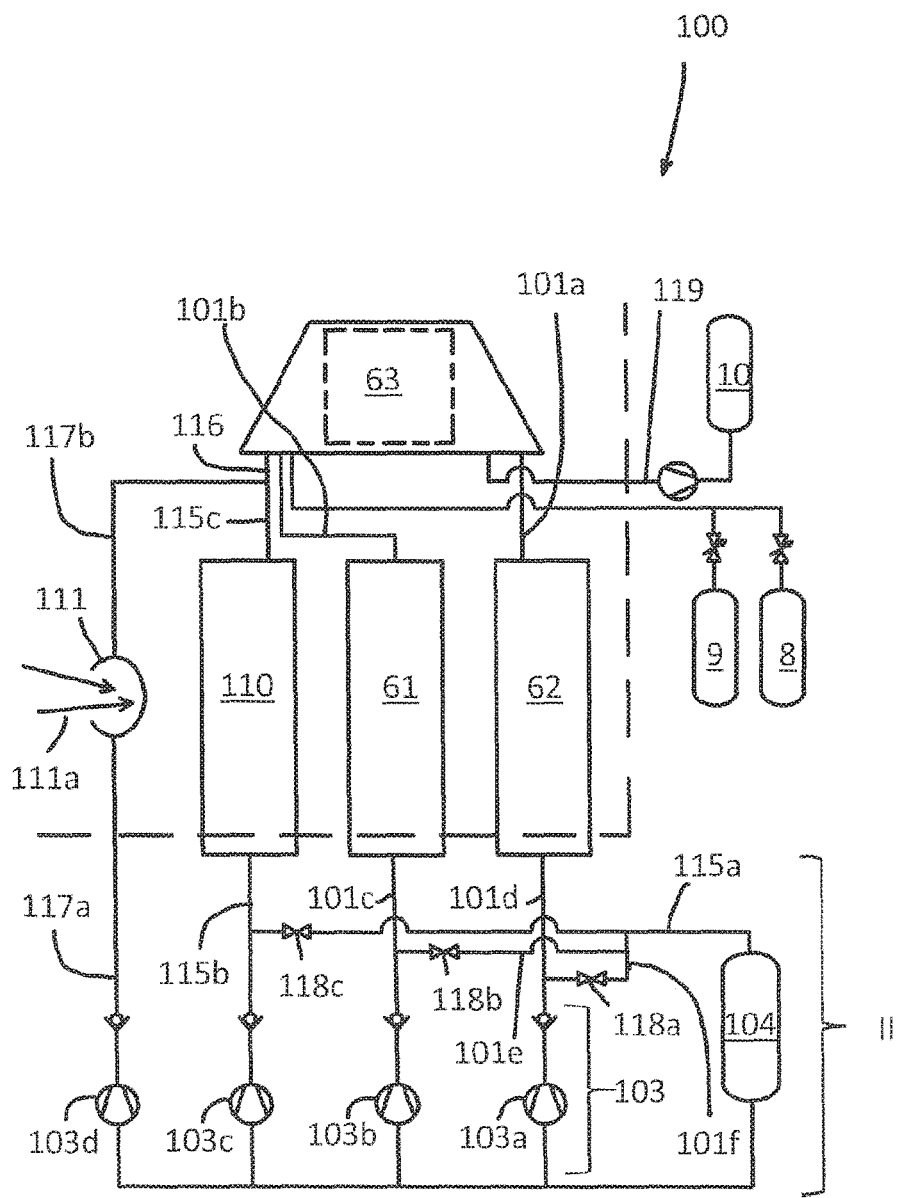
Figure 7A:
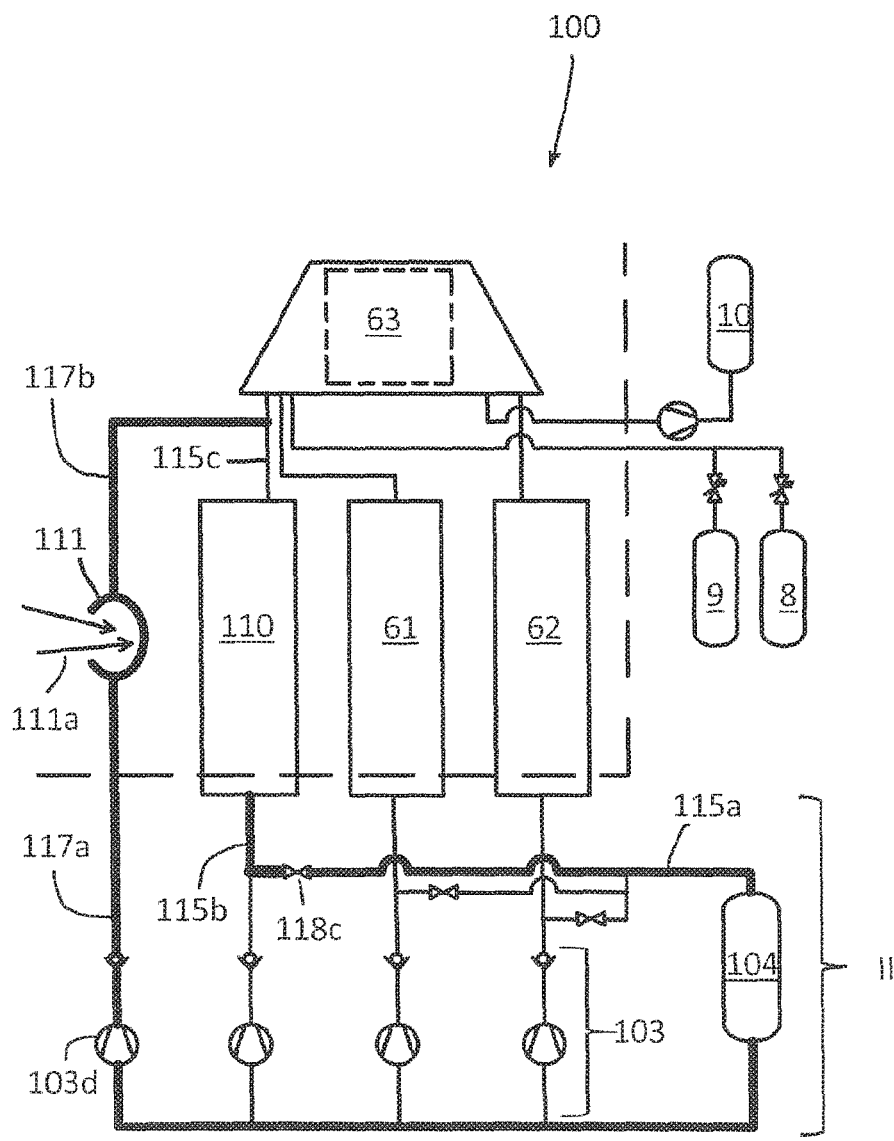
Figure 7B:
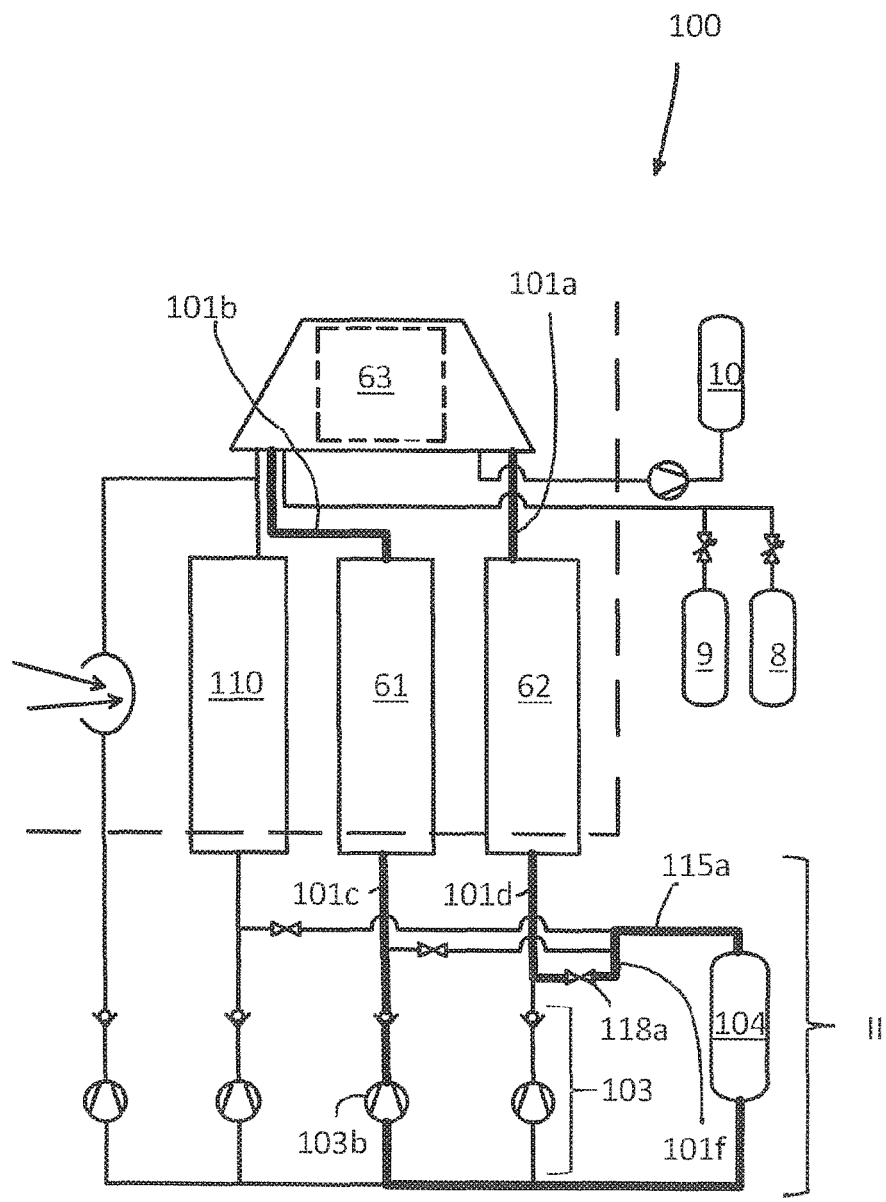
Figure 7C:
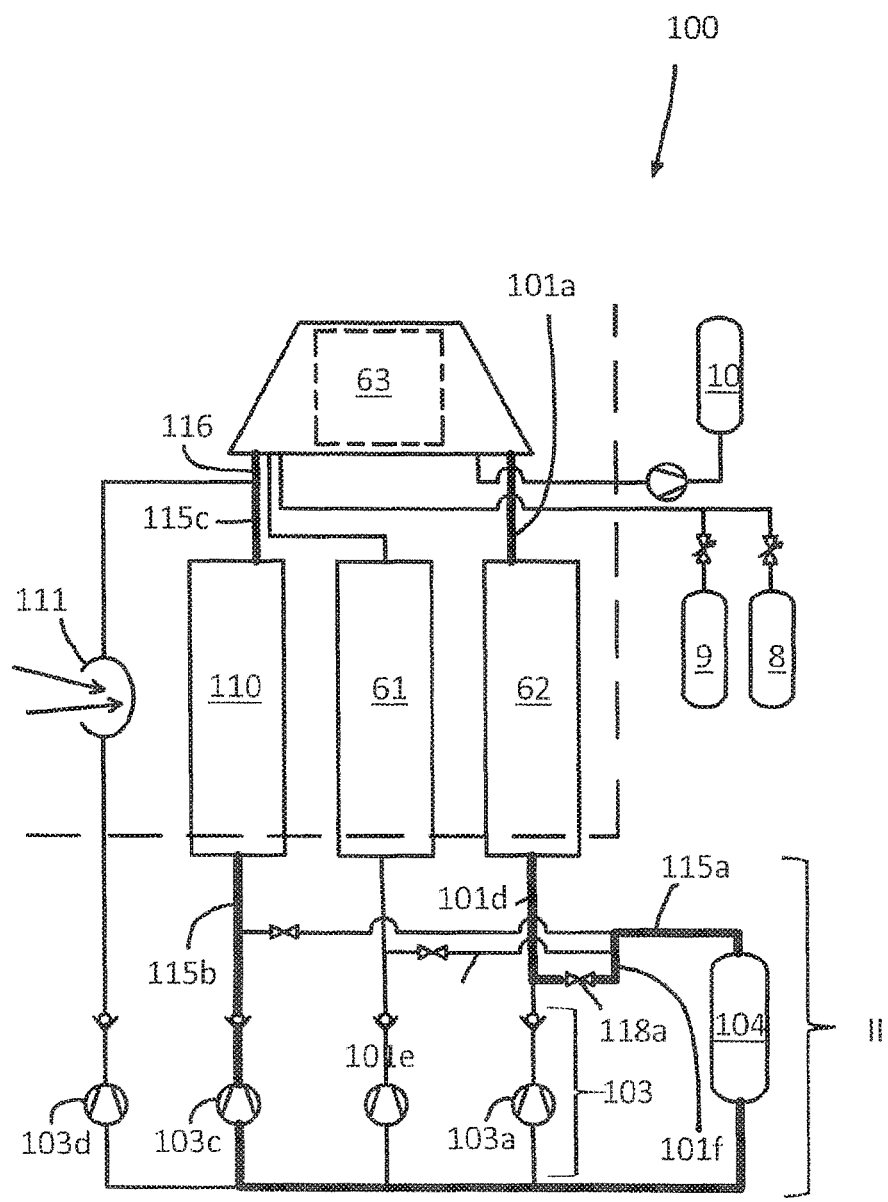
Figure 7D:
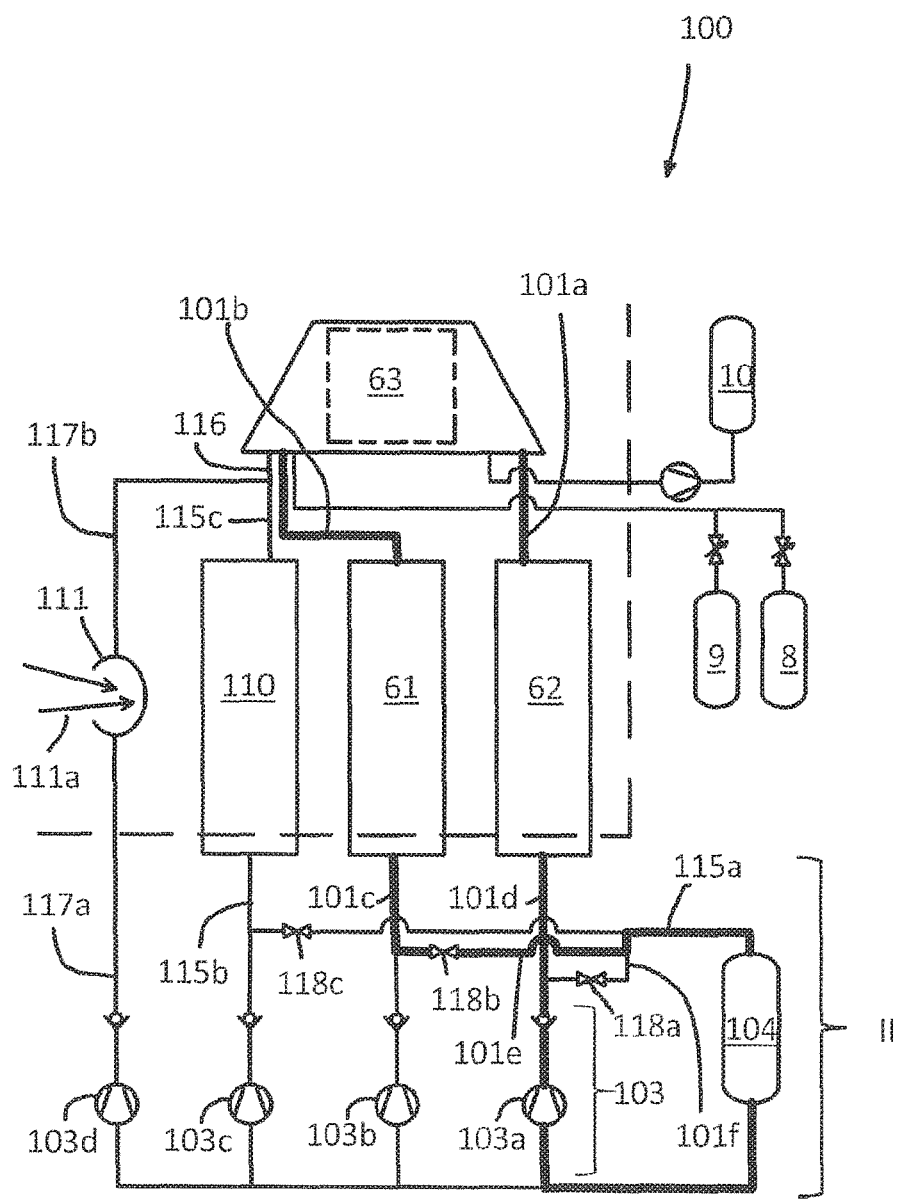
Figure 8A:
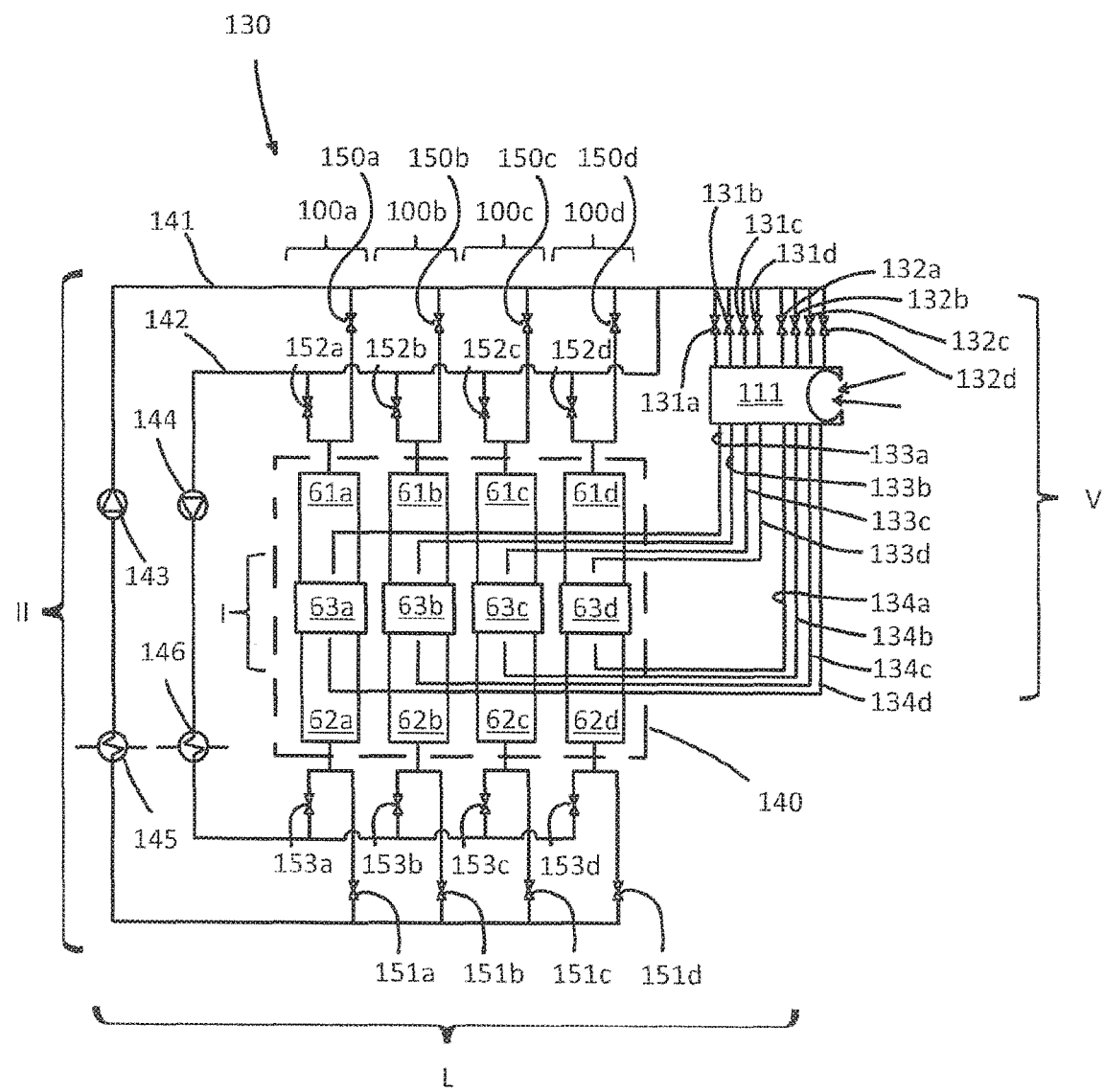
Figure 8B:
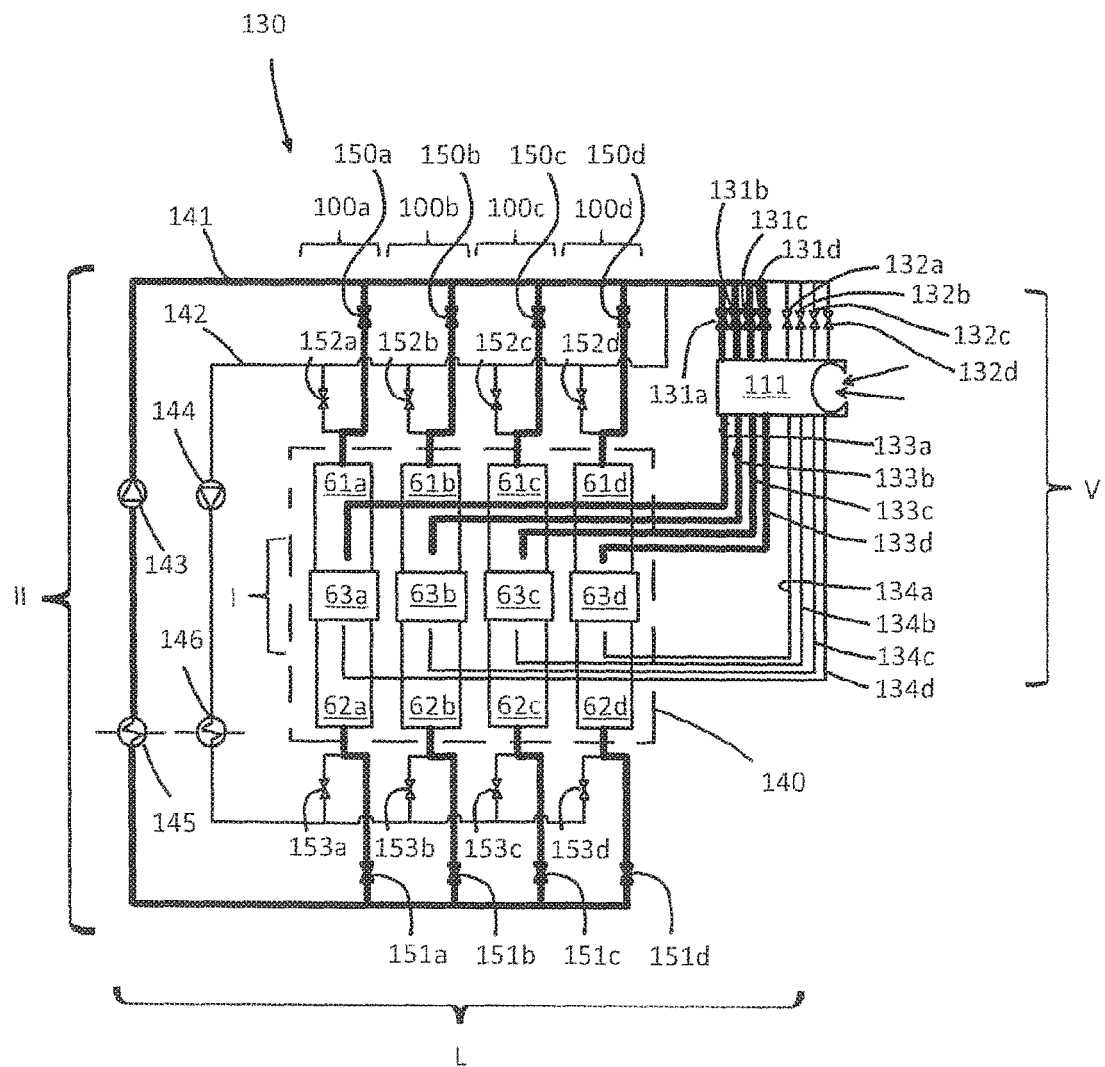
Figure 8C:
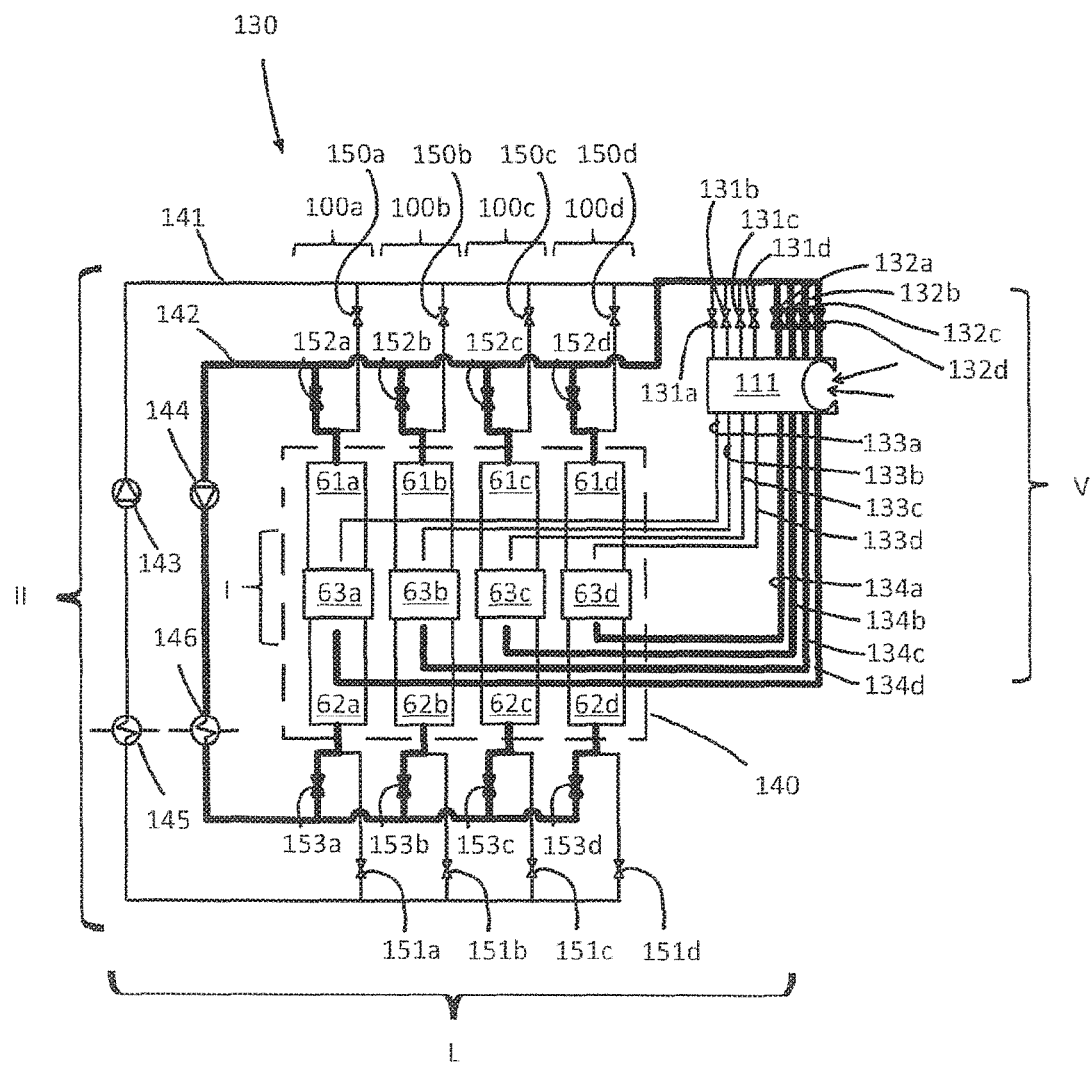
Figure 9:
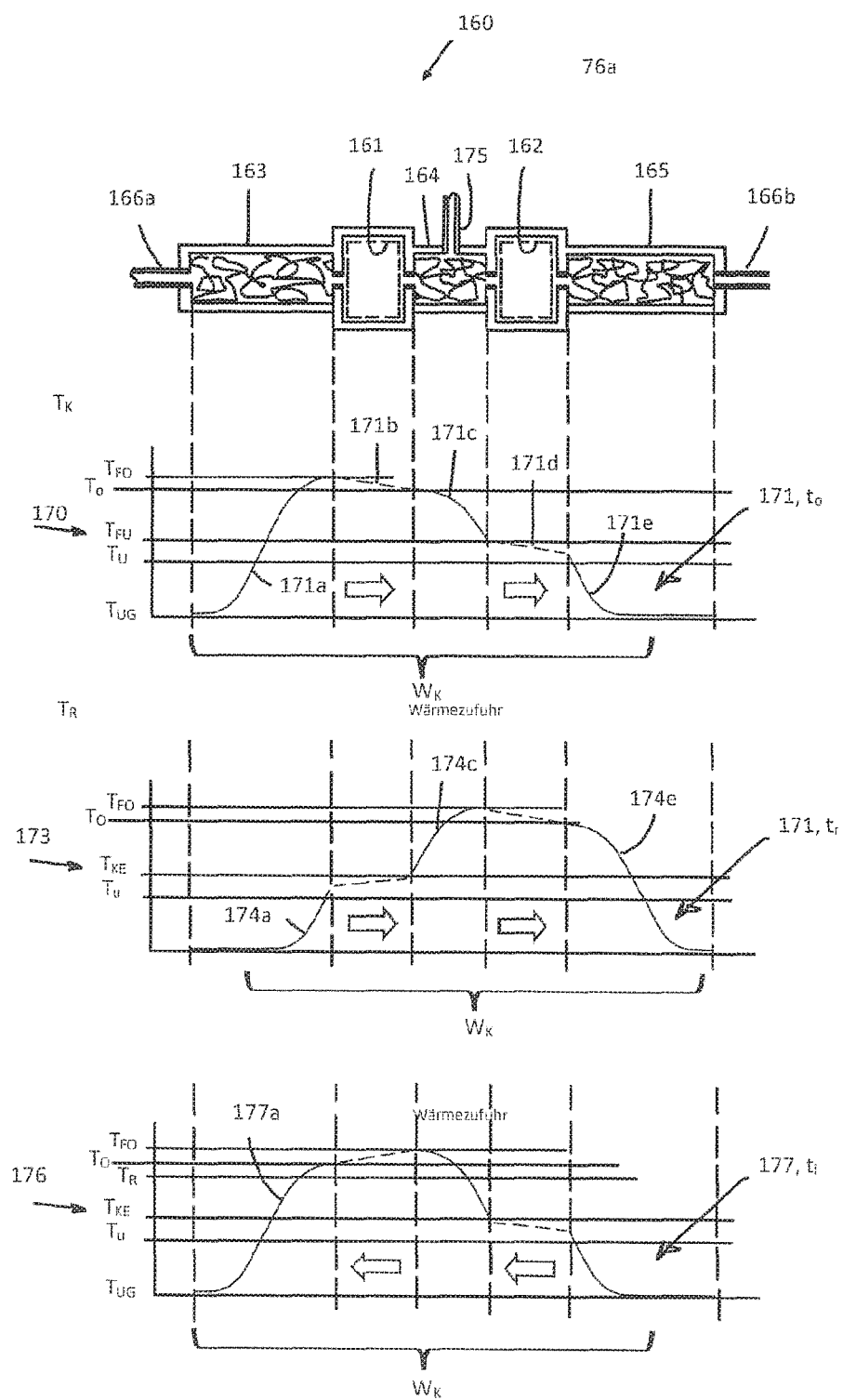
Figure 10:
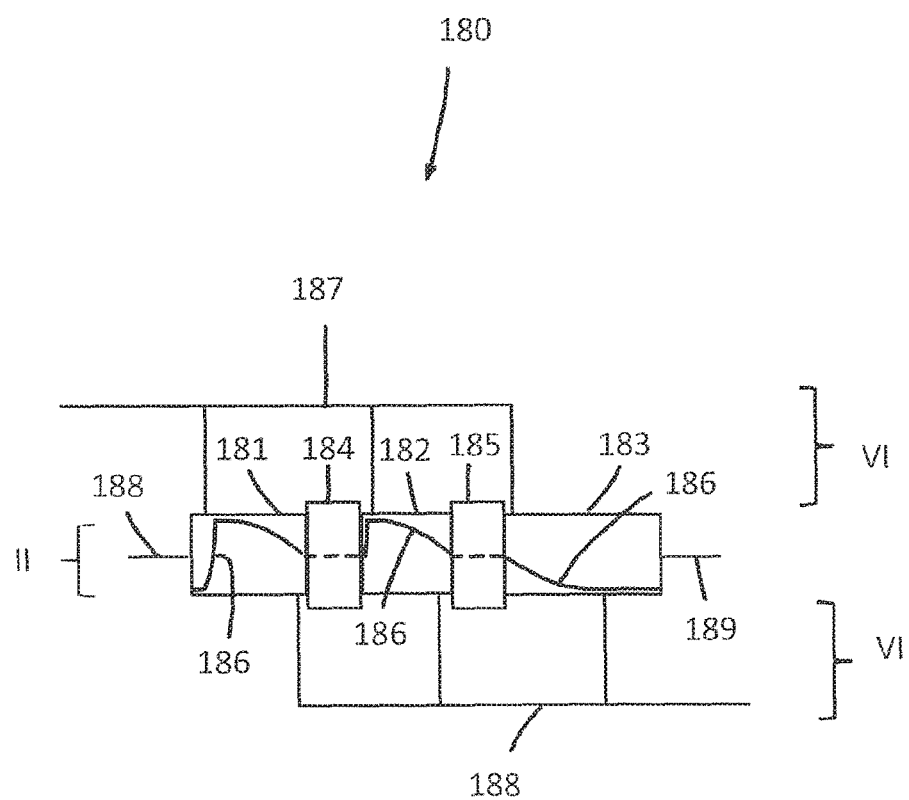
Figure 11:
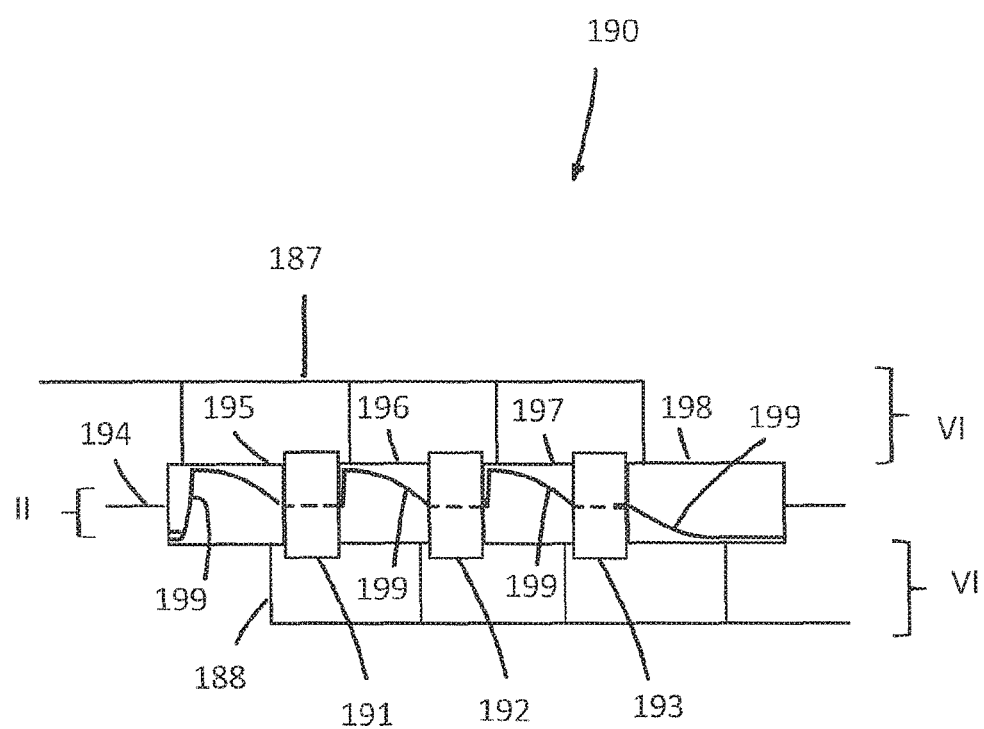

In the following text, the invention will be explained for exemplary purposes with reference to figures. In general, the same items are designated with the same reference numerals in the drawing. In the drawing:

FIG. 1 is a schematic representation of a simple process system having a heat storage, a process unit and a further heat storage arranged in series, FIG. 2 is a temperature profile in the process unit, FIG. 3 shows an embodiment of a stratified heat storage with graphs of the temperature distribution prevailing therein during operation, FIG. 4 shows an embodiment of a simple process group consisting of a process unit arranged between two stratified heat storages, with graphs of the temperature distribution prevailing in the process system during operation, FIG. 5 shows the embodiment of the simple process group of FIG. 4 with graphs of the temperature distribution prevailing in the group in an alternative operating mode, FIG. 6 is a schematic representation of an embodiment of a simple process group with a process unit with a third heat storage for external heat, FIGS. 7a to 7d show the simple process group of FIG. 6 in four different switching states, FIG. 8a is a schematic view of a process system with four simple process groups switched in parallel, FIG. 8b shows the process system of FIG. 8a in a first switching state, FIG. 8c shows the process system of FIG. 8a in a second switching state, FIG. 9 shows a process system according to a preferred embodiment with a combined process group, FIG. 10 shows a process system of the same kind as in FIG. 8, but which is operated with an alternative temperature distribution, and FIG. 11 shows a further process system with a combined process group.

FIG. 1 shows a simple process group 1 for a process system which Itself consists of a plurality of process groups, for example four process groups 100a to 100d as represented in FIG. 8.

The simple process group 1 has a process unit 2 that can be operated between an upper and a lower temperature, wherein a first 3 and a second heat storage 4 are operatively connected to one another by a conduit arrangement L for a heat-transporting medium, and wherein process unit 2 is disposed in a first section I of the conduit arrangement between the first 3 and the second heat storage 4. This configuration means that each heat storage 3, 4 has one end 3a, 4a facing towards process unit 2 and one end 3b, 4b facing away from the process unit, and the first section I of the conduit arrangement has line sections 5a, 5b which connect heat storages 3, 4 to process unit 2.

In the embodiment of the invention shown, process unit 2 is in the form of a cerium reactor, which is suitable for the reactions described in ETH Dissertation No. 21864 (of course, other reactors also fall within the scope of the invention). For this purpose, the input side of the cerium reactor is connected via a line 16a to a $CO_2$ tank 8 through a valve 11 and to a $H_2O$ tank 9 through a valve 12, and the output side thereof is connected via a line 16b through a valve 13 and a pump 14 to a syngas tank 10, in which a gas mixture consisting mainly of CO and $H_2$ as the final products is collected.

It is further shown that the respective sides 3b, 4b of the first 3 and the second heat storage 4 facing away from process unit 2 are connected to one another via a second section II of the conduit arrangement L line 6 thereof. The two sections I and II of conduit arrangement L form a circuit for the heat transporting medium flowing therein, which may be argon, for example, which is also suitable for transporting heat at high temperatures.

A pump assembly 15 serves to maintain the flow direction of the heat-transporting medium in both directions of the circuit and to reverse it as necessary. For the sake of simplicity, in the diagram pump assembly 15 is represented with two pumps 15a and 15b, which can be switched into the circuit or decoupled therefrom via valves 15c and 15c. Of course, the person skilled in the art can design the pump assembly 15 according to the requirements of a given situation.

At this point, it should be noted that in a further embodiment—not shown—line section II may also be omitted. For example, the sides 3b, 4b of heat storages 3, 4 facing away from process unit 2 are then open, that is to say they are in contact with the environment, so the heat-transporting medium may be ambient air passing through heat storages 3, 4, process unit 2 and thus through line section I. Here too, the person skilled in the art will choose the closed circuit shown or an open arrangement depending on the specific circumstances (design of process unit for any industrial process with the respective upper and lower temperatures). Finally, it is possible to provide tanks for the heat transporting medium instead of line section II on the respective sides facing away from process unit 2 so that a medium other than ambient air may then be used as well. These variants are possible in correspondingly adapted form for all embodiments of the invention.

As mentioned above, the process unit 2 shown in the embodiment in the figure is designed as a cerium reactor, and in this case is operated cyclically with a lower temperature in the range of 1300° K. for example, and an upper temperature in the range of 1800° K. for example (here too, it is a simple matter for the person skilled in the art to specify all of the parameters according to the selected process). Accordingly, the reactor must be heated and then cooled again continuously. According to the invention, the heat that is transported away from the reactor as it is cooled is predestined to be stored in one of the heat storages 3, 4 and used for the subsequent (re)heating, and recovered in this way. An efficiency of 100% is not possible, with the consequence that during heating in an elevated temperature range up to the upper temperature (in this case 1800° K.), heat must be supplied to the reactor from the outside, by the Sun 7 for example (or also by other heat sources), which shines on process unit 2 (in this case the cerium reactor), or also indirectly by another heat storage—not shown here to simplify to the figure—which in turn is charged by solar energy (or by heat acquired by some other means) (on this point, see FIG. 6 below). Thus, in the embodiment shown here process unit 2 is designed as a solar reactor filled with cerium oxide ($CeO_2$) and illuminated by the Sun 7.

FIG. 2 qualitatively shows a graph with a temperature profile in the process unit 2 (FIG. 1) in the illustrated embodiment as a cerium reactor, the operating temperature of which varies between the lower temperature $T_u$ (here 1300° K.) and the upper temperature $T_o$ (here 1800° K.).

Apart from a starting process, the heating of the reactor which is at the lower temperature $T_u$ begins at time $t_u$ using heat recovered from heat storages 3, 4 (FIG. 1). This raises the reactor temperature to $T_R$ (the temperature that can be reached using the recovered heat), which is reached at time $t_R$. For the further heating to $T_o$ (reached at time $t_o$), additional heat is needed, and this has to be supplied externally, as described previously, by the Sun shining on the reactor, for example, or also by the supply of heat from another external heat source. The temperature curve thus runs through points $P_u$, $P_R$ and $P_o$, wherein the efficiency of the recovery is given by the ratio of the areas under curve segments $P_u$ to $P_R$ and $P_R$ to $P_o$.

As the reactor is heated from $T_u$ to $T_o$, the cerium is reduced, $O_2$ is released and discharged from the reactor continuously through a pipe which is not shown in FIG. 1 to preserve clarity. After reaching $T_o$, only traces of $O_2$ if any are present in the reactor, which cools slightly due to heat loss during the short residence time in the upper temperature range to temperature $T_K$, the starting point of the reactor cooling. The heat that is extracted from the reactor until the end of cooling to temperature $T_{KE}$ at time $t_{KE}$ is stored in heat storages 3, 4. As soon as the reactor has reached temperature $T_{KE}$, $O_2$ and $H_2O$ (preferably as steam) is fed into the reactor through line 16 (FIG. 1), wherein the synthesis gas is formed by re-oxidation of the cerium and is transported to the syngas tank via line 16b (FIG. 1). During the re-oxidation, the reactor cools a little more to temperature $T_u$, which is reached at time $t_{U/E}$.

Then the cycle can start again. It should be noted that the operating temperature $T_B$ of the heat storages 3, 4, i.e. the maximum temperature of the heat stored in them, is between $T_K$ and $T_R$ since a certain temperature difference between the heat exchanging medium and the reactor, that is to say the heat storages, is unavoidable.

According to FIG. 1, the reactor is cooled-down by the colder heat-transporting medium passing via line section 5a for example from the first heat storage 3 into the reactor (process unit 2), where it is heated and then continues through line section 5b into the second heat storage 4, which is charged thereby, and when the flow direction is reversed can give off heat for heating the reactor in a process which can be repeated cyclically.

Particularly efficient recovery can be achieved if in accordance with a preferred embodiment of the invention the first 3 and the second heat storage 4 are designed as stratified heat storages, i.e., heat storages which can be operated with a defined temperature distribution, thus yielding particularly high efficiency as well as a simple and inexpensive design according to the invention.

FIG. 3 is a schematic representation of a preferred embodiment of a stratified heat storage 30, that is to say a heat storage which is able to create a temperature stratification with a predetermined temperature profile during operation, as is described below. The heat storage 30 shown here essentially has an elongated insulating cladding 31 and a heat storing bulk filling material 32 such as gravel for example, or finer or coarser rock (or other suitable materials). The ends of lines 30a and 30b for a heat transporting medium, in this case a gas such as ambient air or In the case of high operating temperatures argon as well, open into the heat storage. The gas or argon flows through the spaces in the bulk material through the length of the heat storage 30, thereby giving heat off to the bulk material or absorbing heat from it, depending on whether heat is to be given to the heat storage 30 or taken from it.

FIG. 3 also shows diagrams 34, 40, 45 and 50 with various temperature distributions over the length of heat storage 30 depending on the current operating state, wherein the temperature interval from an ambient temperature $T_{UG}$ is sufficient to reach an operating temperature $T_B$. The operating states with a different flow direction of the gas or argon are shown, first from line 30a to line 30b, i.e. to the right, and then reversed from line 30b to line 30a, i.e. to the left, corresponding to the direction of the arrows in the diagrams.

Diagram 34 shows the temperature distribution of the heat storage 30 initially at ambient temperature $T_{UG}$ while it is taking up heat, for which a gas at an operating temperature $T_B$ flows through it to the right, in the direction of the arrow.

Four temperature distribution curves 35 to 38 corresponding to the progressive charging times $t_1$ to $t_4$ are shown. When charging begins, the bulk material 32 located at the inlet to heat storage 30 heats up, causing the gas to lose its heat, so that the subsequent quantities of bulk material 32 are heated correspondingly less and the bulk material 32 quantities after those are heated less still due to the constant temperature loss of the gas. At time $t_1$, a temperature distribution is established which decreases in steps in the flow direction according to curve 35. The continued charging results in the stepped temperature distribution of curve 36 (time $t_2$), i.e. the step gains height with the increasing temperature of bulk material 32 at the inlet to heat storage 30, although the step moves only slightly in the flow direction. Finally, at time $t_3$ the bulk material on the inlet side has reached the operating temperature $T_B$ of the gas, so that as charging continues, the step advances through the bulk material 32 in the direction of flow, see the curve 37 at time $T_4$. In other words, a temperature step or ramp is created in the storage during charging and builds up at the beginning of charging (curves 35 and 36) and then shifts in the flow direction as charging continues (curve 37) until it reaches the far end of heat storage 30 and has passed through it to some degree, so that the heat storage 30 which is fully charged at time $t_4$ has a temperature distribution corresponding to curve 38 at the level of operating temperature $T_B$. It should be noted that the gas entering at operating temperature TB leaves the heat storage at the lower ambient temperature $T_{UG}$ until the step reaches Its outlet (here at line 30b).

Diagram 40 in FIG. 3 shows the temperature distribution when charging stops at time $t_3$, after which heat storage 30 is discharged by passing a gas at ambient temperature $T_{UG}$ through heat storage 30 in the reverse flow direction via line 30b. As mentioned earlier, charging stops at time $t_3$, the heat distribution thus corresponds to curve 37. At time $t_4$, the temperature step has shifted to the left, the heat distribution corresponds to curve 41. It should be noted that the gas entering at ambient temperature $T_{UG}$ exits the heat storage at operating temperature $T_B$ until the step reaches the output thereof (here at line 30a).

Diagram 45 in FIG. 3 shows the temperature distribution in heat storage 30 when the temperature of the inflowing gas drops from $T_B$ while charging is not complete (but still with a flow direction to the right, i.e. from line 30a to line 30b, see the arrow direction), to $T_{UG}$ for example, in this example at time $t_2$ of diagram 34, i.e., after a temperature distribution as Illustrated in curve 37 of diagram 40 has been established.

The Inlet-side bulk material thus heats the gas entering at $T_{UG}$ up to the operating temperature $T_B$ and is thus cooled itself somewhat, although the gas which has now been heated to $T_B$ continues to flow to the right and accordingly heats the region of bulk material 32 located immediately beyond up to $T_B$, and loses more heat in the process, so that a region of bulk material 32 yet farther beyond the first region is still warmed, but to a lower temperature, and so on, thereby yielding a temperature distribution as reflected by curve 46 at time $t_{3*}$. The gas which continues to enter at temperature $T_{UG}$ cools the inlet-side bulk material 32 down further, but absorbs this heat and transports it in the flow direction—at time $t_{4*}$ the temperature distribution corresponds to curve 47 and as gas continues to enter at temperature $T_{UG}$ the temperature distribution by $t_{5*}$ corresponds to curve 48. In other words, the temperature distribution no longer has the form of a step, but rather a wave which passes through heat storage 30 in the flow direction. It should be noted that in this operating mode the gas enters and exits at the lower temperature $T_{UG}$ while the wave forms and runs through heat storage 30 in the direction of flow as time progresses until the wave reaches the outlet at line 30b, and only then does discharging of heat storage 30 begin, which lasts until the wave has passed completely "through" line 30b.

It should be emphasised that waves are formed in a wide variety of shapes, depending for example on how the temperature flowing into the heat storage is changed. In the following text, the simple term "wave" will be used for all such possible wave forms.

Diagram 50 in FIG. 3 shows the temperature distribution in heat storage 30 when the flow direction is reversed at the moment when the temperature distribution corresponds to curve 48 (diagram 40) at time $t_{5*}$, so that the gas (still at lower temperature $T_{UG}$) then flows to the left, from line 30b to line 30a, see the direction of the arrow.

As mentioned earlier, the temperature distribution according to curve 48 at time $t_{5*}$ exists as the starting position at the moment when the flow direction is reversed, although now the wave propagates in the opposite direction of flow, to the left towards line 30a. There follows a period of time after the reversal of the flow direction during which the temperature distribution corresponds to curve 51 at time $t_{6*}$, and thereafter to curve 52 at time $t_{7*}$. It should be noted that during the discharge of heat storage 30 shown in diagram 50 the gas flows in at ambient temperature $T_{UG}$ and initially also flows out at ambient temperature $T_{UG}$, until the preceding temperature edge of the wave has reached line 30a, wherein the rising edge of the wave then increases in accordance with the temperature up to the operating temperature $T_B$ and then drops again in accordance with the following falling edge until heat storage 30 is completely discharged.

During appropriate operation, i.e. In operation with only partial charging even when the heat-transporting gas flows through it continuously, heat storage 30 has a warm side and a cold side, see diagrams 34 and 40 of FIG. 3, wherein in this case the cold side remains substantially at ambient temperature $T_{UG}$, whereas the warm side reaches the operational temperature $T_B$. This also applies for the operation with a wave according to diagrams 45 and 50 if the wave is only shifted into heat storage 30 while the warm side of the heat storage has not yet fallen to the lower temperature (for example to the heat distribution of curve 47 in diagram 45).

FIG. 4 shows a simple process group 60 according to a preferred embodiment, with two stratified heat storages 61, 62 which are constructed according to FIG. 3 so that they can accommodate a heat storing bulk material 66. A process unit, here in the form of a cerium reactor 63, indicated only by a dotted line, is arranged between the first heat storage 61 and the second heat storage 62, wherein line segments 64a and 64b of a first section I of conduit arrangement L (FIG. 1) are visible, connecting cerium reactor 63 to heat storages 61, 62 for operating purposes. Also shown are the openings 65a and 65b of line 6—not shown to simplify the figure—of the second section II of conduit arrangement L (FIG. 1), which provide the circuit for the heat-transporting medium (argon again here) in both flow directions, namely to the right from opening 65a to opening 65b and in the reverse direction to the left from opening 65b to opening 65a.

The operation of the simple process system 60 now causes cerium reactor 63 according to FIG. 2 to be heated and cooled cyclically between an upper temperature $T_o$ and a lower temperature $T_u$, wherein the heat exchange between the first 61 and second 62 heat storages and the reactor 63 is shown in diagrams 70 to 74, but in order to clarify the interaction between the heat storages initially without the external heat input between the recovery temperature $T_R$ and the upper temperature $T_o$ (see diagram 20, FIG. 2), starting instead from the operating temperature $T_B$ of heat storages 61, 62 which exists between $T_R$ and $T_o$. Regarding the external heat supply see the following notes on FIGS. 6 and 7a to 7d.

Diagrams 70 to 74 show temperature distribution curves 76 to 80 for different operating states of the arrangement of the cerium reactor 63 with the first 61 and second 62 heat storages, wherein sections A, B and C each display the area or length in the flow direction of the heat-transporting medium of the first heat storage 61, the cerium reactor 63 and second heat storage 62.

Diagram 70 shows temperature distribution curve 76 after a first part of a startup process of the simple process group 60 at time $t_0$. The first heat storage 61 is charged with heat in such manner that a temperature wave W is present with a peak temperature $T_B$, the wherein the edges of the wave W, fall to ambient temperature $T_{UG}$, here for example 300° K. Cerium reactor 63 and the second heat storage 62 are still at ambient temperature $T_{UG}$. For the second part of the startup process, argon at ambient temperature $T_{UG}$ flows to the right from opening 65a through the first heat storage 61, cerium reactor 63 and heat storage 62 to opening 65b, see the direction of the arrow in diagram 70, with the result that wave W moves to the right, in the flow direction, as described in the notes on diagram 45, FIG. 3.

Diagram 71 shows the temperature distribution curve 77 at time $t_{10}$ wherein the temperature wave W has moved so far to the right in the direction of flow that the leading edge thereof has reached cerium reactor 63 and has partly passed through it, that is to say the argon has flowed through cerium reactor 63 with a rising temperature $T_F$ between $T_{UG}$ and $T_B$ of the edge and has heated it accordingly.

Since the temperature wave W penetrates cerium reactor 63 with a rising edge temperature $T_F$ starting from $T_{UG}$, it heats the reactor constantly, so that the temperature difference between $T_F$ and that of reactor 63 always remains small. Of course, the argon loses some heat as a result of this, see the temperature drop of temperature distribution curve 71 in section B, according to which the argon exits cerium reactor 63 at a temperature below $T_F$. Finally, the second heat storage 62 is heated by the incoming argon so that temperature distribution curve 77 has an edge in section C, see the description of FIG. 3, particularly diagram 34, curve 35 in this regard. Consequently, the heat stored in heat storage 61 is used for heating reactor 63, but also serves to charge heat storage 62.

Moreover, the wave W that is propagated through cerium reactor 63 to some extent "does not see" this (with this exception of the temperature drop due to the transfer of heat between the argon and reactor 63), but of course is torn apart over the length of reactor 63 (section B), as is shown in temperature distribution curve 77.

In summary, the startup process is completed as soon as the temperature distribution corresponds to temperature distribution curve 77: reactor 63 is at $T_u$, wherein first heat storage 61 is charged with wave W in such manner that reactor 63 is brought to $T_B$ thereby and can then be cooled to $T_u$ again. In other words, reactor 63 is at point $P_u$ of diagram 20 in FIG. 2.

Diagram 72 shows temperature distribution curve 78 later, at time $t_{11}$, wherein wave W has advanced so far into cerium reactor 63 that argon is flowing through it at the upper temperature $T_B$. The cerium reactor has thus been heated to a temperature $T_R$ (FIG. 2) close to the upper temperature $T_o$ and is at point $P_R$ on diagram 20, FIG. 2. According to the description of FIGS. 1 and 2, cerium reactor 63 is then preferably brought to $T_O$ (i.e. point $P_O$ In diagram 20) by the additional or external heat from sunlight, see the description of FIGS. 6 and 7 below.

Diagram 73 shows temperature distribution curve 79 at time $t_{12}$, wherein wave W has advanced farther through cerium reactor 63 between time $t_{11}$ and time $t_{12}$, so that now its trailing, falling edge is passing through it and the crest of wave W has propagated as far as the second heat storage 62. As long as the trailing edge of wave W is passing through it, cerium reactor 63 continuously gives off heat to the argon, since despite the ongoing loss of heat by the reactor 63, in accordance with the falling edge the argon is always cooler than the cerium reactor, which loses heat more slowly than the gas.

Again, the difference between the current temperature of the argon and of reactor 63 is small. At time $t_{12}$, reactor 63 is at point $P_{KE}$ of diagram 20, FIG. 2. For the re-oxidation of the cerium and the associated cooling of reactor 63 to $T_u$ (point $P_u$ in diagram 20, FIG. 2), the flow of argon may be stopped.

Then, the flow direction is switched to the left, in the direction of the bottom arrow, i.e. from line 65b to line 65a, whereupon wave W moves to the left and reactor 63 is in turn warmed by the passing of the leading, rising edge and then cooled by the trailing, falling edge thereof.

Diagram 74 shows temperature distribution curve 80 at time $t_{14}$, wherein wave W has passed so far through cerium reactor 63 that after heating to $T_R$ (and by external heat to $T_o$, see diagram 20, FIG. 2), the reactor has cooled back down to $T_{KE}$ and the corresponding heat is stored in heat storage 61.

In summary, after a starting process according to diagram 70, process group 60 has a temperature distribution according to diagram 71, wave W is then sent through reactor 63 in a flow direction (in this case: to the right) so that the temperature distribution according to diagram 73 is present, and from there wave W is then sent back through the cerium reactor 63 in the opposite flow direction (in this case: to the left) until the temperature distribution according to diagram 74 is present, serving as the starting point for a new cycle, i.e. in the one flow direction to the state according to diagram 73 and then back in the other flow direction to the state according to diagram 74, and so on for as long as the process is to run. Starting from the middle of reactor 73, the wave W moves to symmetrically located end positions in heat storages 61 and 62. After the startup process, the wave extends along the length $L_{SYM}$ of cerium reactor 63 into both heat storages 61, 62, or sections A and C, see diagram 74 in conjunction with diagram 73. This means that during operation the outer sections of both heat storages around openings 65a and 65b are always at ambient temperature $T_{UG}$, that is to say they remain cold, while Inside the process system a cyclical heat exchange takes place between reactor 63 and heat storages 61, 62 due to the wave W which is continuously travelling back and forth as shown in diagrams 73, 74.

FIG. 5 shows a further embodiment in which the process is not symmetrical (FIG. 4), but takes place asymmetrically in that a wave W passing to the right through reactor 63 is stopped when the temperature distribution corresponds to diagram 72 (FIG. 4). By way of explanation, FIG. 5 shows such a sequence with diagrams 85 to 87, corresponding to diagrams 71, 72 and 74 of FIG. 4, that is to say the temperature distribution curves 88 to 90 thereof (at times $t_{20}$ to $t_{23}$) are the same as temperature distribution curves 77, 78 and 80. As mentioned, however, the point in time at which the flow direction is reversed is changed, and this takes place when the temperature distribution according to curve 89 corresponding to diagram 86 is present.

As a result, reactor 63 is heated starting from the state according to the diagram 85 until the state according to diagram 86 and is cooled after the flow is reversed starting from the state according to diagram 86 to that of diagram 87 after which the cycle begins again. Accordingly, the oscillating wave W penetrates less deeply into second heat storage 62 than is the case for first heat storage 61, so that the end positions of the storages are no longer symmetrical, but asymmetrical. The corresponding lengths $L_{ASYM}$ are plotted in diagram 87 in conjunction with diagram 86. It follows that the second heat storage 62 may advantageously be designed to be shorter than is the case in the embodiment according to FIG. 4, while of course both outer ends of the heat storages 61, 62 are also always at ambient temperature $T_{UG}$ in the region of openings 65a and 65b, and so remain cold.

The heat losses during the heat exchange described with reference to FIGS. 4 and 5 are small, the efficiency of the heat recovery achieved in this way is high. Moreover, in conjunction with the description of FIG. 2 the person skilled in the art will have no difficulty in defining the switching times for the flow in a specific situation with regard to any process involving cyclically alternating temperature. In particular, the person skilled in the art may determine the temperature difference to which the reactor 63 is exposed during heating and cooling from the slope of the edges of wave W and the speed with which it moves through reactor 63, and conversely this also makes it possible to design it exclusively for small temperature differences as defined beforehand In the embodiment of the simple process group 60 described in FIGS. 4 and 5, the first 61 and the second heat storage 62 collectively have a heat-storing filler of bulk material 66, wherein the heat-transporting medium is preferably a gas, particularly preferably argon. Furthermore, the respective sides of heat storages 61 and 62 facing away from reactor 63 (at openings 65a and 65b) always run at ambient temperature $T_{UG}$ during operation, while the sides thereof facing towards reactor 63 around the line sections 64a and 64b (after the start process) always work at elevated temperatures between $T_u$ and $T_B$, the peak temperature of the (oscillating) wave W.

Accordingly, during operation the first heat storage (61) and the second heat storage (62) each have a cold side, wherein a second section (II) of the conduit arrangement (L) is preferably provided which connects these cold sides to one another. The cold sides may also be in contact with the environment or connected to other systems if second section II is not present, as is the case in one embodiment described with reference to FIG. 1. It should be added here that in actual operation the cold sides may become slightly warm over time. The person skilled in the art may then provide a cooling unit for the heat-transporting medium in second section II of conduit arrangement L appropriate for the given situation should this be necessary, or may also configure the process system so that it can cool down during the interruptions that occur during solar operation (night-time).

FIGS. 4 and 5 further show that heat storages 61, 62 are connected to each other via lines 64a and 64b (Section I of conduit arrangement L), while according to FIG. 1 all the switching elements necessary for operating the process system, such as the pump assembly 15 may be provided in second section II of conduit arrangement L—with the advantage that the switching elements are arranged on the cold side, and are thus unburdened by high temperatures, and can be of correspondingly simple construction. On the warm or hot side, where temperatures may reach above 1300° K. or 2300° K. or more depending on the application, simple pipe connections such as ceramic pipes are sufficient. It follows that switching members for operating both the first I and second II sections of the conduit arrangement are preferably arranged in the second section II of the conduit arrangement. In this context, the first line section is particularly preferably free of switching elements for operating the simple process group. Heat storages 60, 61 must be constructed with a minimum length so that the cold side thereof does not exceed ambient temperature $T_{UG}$ during operation. This minimum length is represented graphically in FIGS. 4 and 5 with a length $L_{SYM}$ or $L_{ASYM}$ which is assigned to each heat storage 60, 61—these are the segments in sections A and C that the wave W requires in order to travel back and forth. Lengths $L_{SYM}$ and $L_{ASYM}$ of heat storage 61 in the embodiments according to FIGS. 4 and 5 are the same size, while length $L_{ASYM}$ of the heat storage 62 in FIG. 5 is shorter than the $L_{SYM}$ of the heat storage 62 in FIG. 4 because the wave W does not penetrate as far into heat storage 62.

Consequently, the person skilled in the art is able to dimension the length of the heat storages in the embodiment of FIG. 4 to minimally $L_{SYM}$ and in an embodiment according to FIG. 5 the length of the one heat storage (here the second heat storage 62) shorten it further to $L_{ASYM}$, which makes manufacturing easier.

At this point it should also be emphasised that the cold side of the heat storages is at ambient temperature $T_{UG}$ for most applications. Depending on the specific case, however, it may be appropriate for the cold sides, i.e. the sides of the heat storages facing away from the process unit are at a higher temperature during operation, up to 400° C. for example or even higher—for example if the heat transporting fluid still circulates in other systems connected to the process system or itself is in heat exchange contact with such other systems. In the present case, however, the term "cold side" is always used to distinguish these sides from the warm side of the heat storages. The person skilled in the art may provide a startup process which is specifically designed for operation with a cold side that is at higher than ambient temperature $T_{UG}$,—the operating principle according to the invention described in FIGS. 3 to 5 is not changed thereby.

The conditions described in the preceding text, relating particularly to the warm and cold sides of the heat storages apply not only for a simple process group operating in stand alone mode, but also for process systems consisting of several process groups and process systems with combined process groups.

From the preceding description relating to FIGS. 1 to 5 and also according to the embodiments described in FIGS. 6 to 10, a method is also revealed for cyclically heating and cooling one or more process units 2 that are operable between an upper and a lower temperature, and wherein one process unit in each case is switched between a first 3 and a second 4 heat storage for operating purposes,
   wherein in a charged state the first 3 and the second 4 heat storages give off heat in the upper temperature range and the temperature tends towards the lower temperature during discharge,
   wherein during charging the first 3 and the second 4 heat storages can be charged with heat initially in the lower temperature range and subsequently in the upper temperature range, and
   wherein process unit 2 is brought alternately to the upper temperature and the lower temperature by cyclically changing the flow direction of a heat transporting medium flowing through the first 3 and the second 4 heat storages—and thus also through said process unit 2.

In this context, one flow direction is preferably maintained before the cyclic reversal until the one or more process units 2 have been heated from the lower temperature to a recovery temperature and subsequently cooled again to the lower temperature (see the embodiment of FIG. 4).

Also preferably, the heat storages are operated with a wave-like temperature stratification which forms a wave W. The reversal of the flow direction is particularly preferably clocked in such manner that the wave advances into and retreats from both heat storages to the same distance in a continuous, constant propagation in symmetrical operation. Alternatively, the change of flow direction may also be clocked in such manner that the wave advances a shorter distance into one heat storage than the other, and retreats from it in continuous asymmetrical oscillating operation, preferably until the peak temperature thereof.

The advantages that are achievable according to the invention with a cold (and warm) side of the heat storages are derived particularly effectively if preferably in operation the wave W does not fully reach the sides of the heat storages facing away from the process unit, such that these sides remain below a predetermined temperature, and preferably does not reach them at all, such that these sides remain cold.

Finally, the person skilled in the art can also adjust the flow to the process unit in such manner that a current temperature difference between the heat transporting medium flowing through the process unit and the process unit itself does not exceed a predetermined value.

In all the embodiments shown, the process unit can be configured as either a directly or Indirectly irradiated solar reactor. As explained earlier, however, the heat from a transporting medium which flows through the process units may also be used to raise their temperature from $T_R$ to $T_O$ during the warming cycle.

FIG. 6 shows a schematic diagram of a simple process group 100 shown in Isolation, in which the external heat, here solar energy for example, is introduced between points $P_R$ and $P_O$ in diagram 20 of FIG. 2 indirectly, i.e. without direct Illumination of the process unit 2 (FIG. 1) by the Sun. As was mentioned earlier, however, energy from another source may also be used Instead of solar energy.

A process unit again in the form of a cerium reactor 63 is shown, in which the lines for circulating the heat transporting medium and all the reagents needed terminate for operating purposes. The diagram shows lines 101a and 101b of a first section I of a conduit arrangement L, and a second section II of the conduit arrangement L with a pump assembly 103 having pumps 103a and 103b, each of which is equipped with a check valve, and a tank 104 for the heat transporting medium, here again argon. Also visible are the $CO_2$ tank 8, the $H_2O$ tank 9 and the syngas tank 10 (see also the description associated with FIG. 1). A first heat storage 61, and a second heat storage 62 are constructed according to the embodiment shown in FIG. 4. To this extent, and apart from direct Illumination of the reactor 63 by the Sun 7 (FIG. 1) the simple process group 100 is the same as the one in FIG. 1.

However, to this are added a third heat storage 110 and a solar receiver 111 for sunrays 111a (or another suitable heat source), both of which may be switched into the circuit of the heat transporting medium, wherein receiver 111 and heat storage 110 are designed to generate and storage heat to at least the upper temperature $T_o$. The third heat storage 110 is preferably embodied as a stratified heat storage according to FIG. 3 and is charged and discharged in accordance with diagram 40 of FIG. 3. It is also connected to argon tank 104 in the second section of conduit arrangement L via lines 115a and 115b (via a pump 103c there) and connected to a feed line to reactor 63 in the form of a line 116 via line 115c. Solar receiver 111 is in turn connected to argon tank 104 via line 117a (via pump 103d) and is optionally switchably connected either to line 116 or to line 115c via line 117b, so that a heat transporting medium (here: argon) warmed thereby can be conveyed either directly to reactor 63 or into third heat storage 110, driven by pump 103d in line 117a. Valves 118a to 118c regulate the flow and the path of the heat-transporting medium in process system 100 with lines 101c to 101f and together with check valves assigned to pumps 103a to 103d.

It should be pointed out that the dashed line in process system 100 in the figure represents the boundary between the warm side thereof, which includes the reactor 63, and its cold side, in which all switching elements such as valves and the pump assembly 103 are arranged. The advantageous arrangement according to the invention is made evident again, according to which all switching devices may be disposed easily and inexpensively in the cold area (preferably ambient temperature $T_{UG}$), whereas in the warm area, at temperatures between $T_R$ and $T_O$, which may exceed 1300° K. or 2300° K., only pipes for the heat transporting medium and substances which react or are formed in the reactor must be provided, and these may be made simply and inexpensively from ceramic for example.

Line 117b forms a third section III and line 115c a fourth section IV of conduit arrangement L This means that according to the embodiment shown, a feeder 116 for the heat transporting medium in the upper temperature range is arranged upstream of the process unit in first section I of conduit arrangement L, more preferably a solar receiver for heating the heat transporting medium is provided, wherein a third section of the conduit arrangement connects the solar receiver to the feed, and finally, particularly preferably, a third heat storage is provided and is connected to the feed via a fourth section of the conduit arrangement, wherein heat from the solar receiver may be stored in this third heat storage.

The embodiment according to FIG. 6 also shows that the receiver may be arranged separately from the process unit (for example a reactor for chemical reactions or another unit for recovering heat) for any solar powered process system, either in direct connection with a process unit of the process system, or indirectly via a heat storage assigned to the receiver.

FIGS. 7a to 7d show how the simple process group 100 can be switched for the various operating phases of the reactor 63 shown in FIG. 2 (and also for the method steps described above), in which case heat storages 61 and 62 are preferably operated according to FIGS. 4 and 5.

FIG. 7a shows a switching state of the simple process group 100 in time period to $t_O$ $t_K$ or $t_{KE}$ to $T_{UE}$ (see FIG. 2, diagram 20, with points $P_O$ to $P_K$ and $P_K$ to $P_{UE}$), in which the reduction of the cerium is finished and the re-oxidation is taking place, so that here there is no heat transporting medium flowing through reactor 63. During these periods, $t_R$ to $t_O$ or in period $t_{KE}$ to $t_{UE}$ heat from solar receiver 111 can be stored to third heat storage 110 via the heat-transporting medium (here: argon). For this purpose, pump 103d displaces argon from tank 104 through receiver 111, where it absorbs heat, then through lines 117b and 115c into heat storage 110, which is thus charged with heat, and finally cooled to ambient temperature $t_{UG}$, back into tank 104. The lines Involved in this circuit are highlighted in bold in the figure.

FIG. 7b shows a switching state of process system 100 for a flow direction to the right in the embodiments of FIGS. 4 and 5, that is to say for example in the period $t_U$ to $t_R$ or between points $P_U$ to $P_R$ (see FIG. 2), in which reactor 63 is heated by recovered heat, that is to say heat stored in the first heat storage 61. Initially, the temperature distribution in heat storages 61, 62 is according to diagram 71 of FIG. 4 or also diagram 85 of FIG. 5 depending on the embodiment according to which the process system is operated. For this purpose, pump 103b displaces argon from tank 104 through the receiver, through the first heat storage 61, where it absorbs heat, then through line 101b into reactor 63, and from here through line 101a into second heat storage 62, which is thus charged with heat, and finally, cooled to ambient temperature $t_{UG}$, back into tank 104. The lines Involved in this circuit are highlighted in bold in the figure.

However, this switching state is also present in period $t_K$ to $t_{KE}$ or between points $P_K$ to $P_{KE}$ (see FIG. 2) when heat is extracted from the reactor 63 which is to be cooled and stored in heat storage 62 for recovery, as shown in diagram 73 of FIG. 4. Then, as it cools, argon flows from heat storage 61 and through the reactor 63, where it absorbs the heat thereof and storages it in heat storage 62.

FIG. 7c shows a switching state of process system 100 in the period $t_R$ to $t_O$ or between points $P_R$ to $P_O$ (see FIG. 2), in which the reactor 63 is brought to the upper temperature $T_O$ by the external heat (in this case from receiver 111) stored in the third heat storage 110. As was indicated earlier, heat storage 110 may also be charged by forms of energy other than solar energy—and an energy source other than the Sun might be used instead of receiver 111 to introduce heat into process system 100.

For this purpose, pump 103c displaces argon from tank 104 through heat storage 110, where it absorbs heat, then through lines 115c and 116 into reactor 63, and from here through line 101a into heat storage 62, which is thus charged with heat above $T_R$. and finally, cooled to ambient temperature $t_{UG}$, back Into tank 104. The lines involved in this circuit are highlighted in bold in the figure.

Alternatively, pump 103d may also be switched in, so that heat-transporting fluid warmed simultaneously by receiver 111 and the third heat storage 110 flows into the reactor through line 116. Likewise, only pump 103d can be activated, not pump 103c, so that the switching state of process system 100 corresponds to that of FIG. 1 with direct illumination of the reactor by the Sun.

It should be emphasized that in diagram 73 of FIG. 4 and in diagram 86 of FIG. 5, the peak temperature of wave W is represented without this charging with heat above $T_R$, since in these diagrams the motion of wave W is discussed as a result of the construction of the process group 60 illustrated there. However, with a switching state of an inventive process system according to FIG. 7c, efficiency is increased still further by the external heat that is recovered in this way. It should also be noted that this helps to avoid the small, steady fall of the peak temperature of the travelling wave in diagrams 45 and 50 of FIG. 3, so that temperatures $T_R$ and $T_O$ can really be kept constant for an indefinite operating period. The person skilled in the art can easily configure process system 100 according to the requirements of the specific circumstances.

FIG. 7d shows a switching state of process system 100 for a flow direction to the left in the embodiments of FIGS. 4 and 5, that is to say for example for a returning wave W as shown in diagram 73 of FIG. 4 in the period $t_U$ to $t_R$ or between points $P_U$ to $P_R$ (see FIG. 2), in which reactor 63 is heated by recovered heat, that is to say unlike FIG. 7b not by heat stored in first heat storage 61 but in second heat storage 62. However, returning wave W also causes the cooling of reactor 73 in period $t_K$ to $t_{KE}$ or between points $P_K$ to $P_{KE}$ (see FIG. 2), wherein heat is extracted from the reactor 63 to be cooled and now stored for recovery in heat storage 61.

For this purpose, pump 103a displaces argon from tank 104 through heat storage 62, then through line 101a into reactor 63, and from there through line 101b into heat storage 61 and finally, cooled to ambient temperature $t_{UG}$, back into tank 104. The lines involved in this circuit are highlighted in bold in the figure.

FIG. 8a shows a process system 130 which consists of four simple process groups 100a to 100d, which are all constructed similarly to process group 1 of FIG. 1 and are connected in series. To simplify the figure, the tanks 8 for $CO_2$, 9 for $H_2O$ and 10 for the syngas belonging to each process group 100a to 100d have been omitted. The person skilled in the art will have no difficulty in configuring the tanks and lines for process system 130 according to specific circumstances.

Each of these simple process groups 100a to 100d thus has a process unit 63a to 63d in the form of a cerium reactor with two heat storages 61a to 61d and 62a to 62d enclosing them. Conduit arrangement L is designed in such manner that heat transporting can flow through each of the process groups 100a to 100d In both directions, so that a cyclical exchange of heat takes place inside each of the process groups 100a to 100d, wherein a wave W which oscillates back and forth is formed, as was described earlier with reference to diagrams 70 to 74 and 85 to 87 (i.e., symmetrically or asymmetrically) of FIGS. 4 and 5. In this context, wave W forms in process group 100a, wave $W_b$ forms in process group 100b, and so on.

It is then preferred that the waves $W_a$ to $W_d$ are propagated with a phase shift between them, see the description below.

The warm side of the simple process groups 100a to 100d is delimited by the dashed line 140 (see FIG. 6 on this subject), outside of line 140 is the cold side of process groups 100a to 100d with the second section II of conduit arrangement L. Inside the dashed line 140 is the warm side with the first section I of the conduit arrangement L (see also the related description for FIGS. 1 to 7).

In the present case, the cold sides of the heat storages 61a to 62d are connected by two parallel lines 141, 142, so that one dedicated line, 141 or 142, is available for each flow direction. In the same way, a dedicated pump 143, 144 is also provided in each line 141, 142, wherein the pumps operate in opposite flow directions. The lines 141, 142 connect the cold sides of the heat storage 61a to 62d to each other, that is to say between different groups, to create the parallel circuit.

Heat exchangers 145, 146 form a cooling unit for the heat-transporting medium (see the description of FIG. 5 on this subject).

The connection of conduit arrangement L to enable the heat transporting medium to flow through the process groups 100a to 100d with cyclical phase shift and alternating directions is assured with valves 150a to 150d, 151a to 151d, 152a to 152d and 153a to 153d. Check valves are omitted from FIGS. 8a to 8c for purposes of clarity—the person skilled in the art will have no difficulty providing suitable valves of this kind based on the model of FIGS. 7a to 7d.

The result is a plurality of simple process groups 100a to 100d, each composed of a process unit 63a to 63d and two heat storages 61a to 61d and 63a to 63d enclosing them between them which are connected in parallel by conduit arrangement L, and wherein the heat storages 61a to 61d and 63a to 63d have a cold side and a warm side in operation, the warm sides of the heat storage of each group 100a to 100d are connected to the associated process unit 63a to 63d and the cold sides are connected to each other across the groups by conduit arrangement L.

FIG. 8a shows a further or external energy source 111, which is connected to heat storages 61a to 61d and 62a to 62d via lines 133a to 133d and 134a to 134d of a section V of the conduit arrangement L. Thus, heat transporting fluid charged with heat from the energy source 111 can be brought to each of the heat storages 61a to 62d through section V. With this heat the operating temperature in each process unit for example 63a to 63d is raised from $T_R$ to $T_O$ in the time interval $t_R$ to $t_o$ (see the description of FIG. 2).

Lines 133a to 134d are opened and closed by means of valves 131a to 131d and 132a to 132d, so that heat is supplied to the respective heat storage 61a to 62d in controlled manner. Lines 133a to 134d are preferably fed by lines 141, 142, so that lines 133a to 134d are included in the heat transporting fluid circuit.

A controller which is connected for operating purposes to valves 131a to 132d and valves 150a to 150d, 151a to 151d, 152a to 152d and 153a to 153d and actuates said valves as will be explained in the following description of FIGS. 8b and 8c has been omitted from the figure for the sake of clarity.

FIG. 8b shows the operating state of process system 130, when heat transporting fluid flows through process units 63a to 63d of the process groups 100a to 100d from the heat storages 61a to 61d to the heat storages 62a to 62d (from top to bottom in the drawing). Pump 143 is active, valves 150a to 150d and 151a to 151d are opened by the controller, so that the lines drawn in bold (but not those in normal line thickness) of section II of the conduit arrangement L deliver heat transporting fluid. Waves $W_a$ to $W_d$ thus run from the heat storages 61a to 61d to and into the process units 63a to 63d, or In the case of symmetrical operation run out of them again by running into the heat storages 62a to 62d.

At this point it should be noted that the valve pairs 150a, 151a and 150b, 151b up to pair 150d, 151d must be connected individually to enable phase-shifted operation.

For example, valve pair 150a, 151a first and pair 150d, 151d last are switched on and off so that the corresponding waves $W_a$ to $W_d$ pass through their cerium reactors (63a to 63d) with a phase shift.

The control then opens valves 131a to 131d assigned to each process unit (or in the embodiment shown: each cerium reactor) 63a to 63d for time period $t_R$ to $t_O$, so that the temperature of the heat transporting fluid at the inlet to process units 63a to 63d is raised from $T_R$ to $T_O$ while the rising edged of the respective wave $W_a$ to $W_d$ flows into the process unit 63a to 63d. Regarding this supply of heat, see FIG. 2 and the associated description.

Of course, valves 131a to 131d also open with a phase shift, corresponding to the phase shift of waves $W_a$ to $W_d$.

FIG. 8c shows the operating state of process system 130 when heat transporting fluid flows through the process units 63a to 63d of process groups 100a to 100d, from the heat storages 62a to 62d towards the heat storages 61a to 61d (from the bottom to the top in the drawing). Now, pump 144 is active, valves 153a to 153d and 152a to 152d are open, so that the lines drawn in bold (but not those in normal line thickness) of section II of the conduit arrangement L deliver heat transporting fluid. Waves $W_a$ to $W_d$ thus run towards the heat storages 61a to 61d or penetrate them.

At this point it should be noted that the valve pairs 153a, 152a and 153b, 152b up to pair 153d,152d must be connected individually to enable phase-offset operation. For example, valve pair 153a, 152a first and pair 153d, 152d last are switched on and off so that the corresponding waves $W_a$ to $W_d$ pass through their cerium reactors (63a to 63d) with a phase offset.

The controller then opens valves 132a to 132d assigned to each process unit (or in the embodiment shown: each cerium reactor) 63a to 63d for time period $t_R$ to $t_O$, so that the temperature of the heat transporting fluid at the inlet to process units 63a to 63d is raised from $T_R$ to $T_O$ while the rising edge of the respective wave $W_a$ to $W_d$ flows into the process unit 63a to 63d. Regarding this supply of heat, see FIG. 2 and the associated description.

The valves 132a to 132d are also opened with a phase offset, corresponding to the phase offset of waves $W_a$ to $W_d$.

A period of a complete oscillation by a wave $W_a$ to $W_d$ according to the arrangement of FIG. 4 lasts twice as long as the time $t_{halb}=t_{UE}-t_U$, see FIG. 2. For the frequency f of the complete oscillation of wave $W_a$ to $W_d$, it follows that $f=\frac{1}{2} t_H$. If all process groups 100a to 100d are operated at the same frequency f (which is not absolutely necessary), the person skilled in the art may envisage $\frac{1}{8} \times 2$ $t_H$ for the time during which a valve 133a to 134d is open, which thus results in a constant flow of heat transporting fluid from the further energy source 111 to the heat storages 61a to 62d. This in turn renders a third heat storage 110 unnecessary, as is the case in the arrangement according to FIG. 6.

If an inconstant flow is created due to a different switching arrangement of valves 133a to 134d, a smaller, third heat storage may be chosen, and this is still more favourable than the production and maintenance costs associated with the arrangement of FIG. 6. In other words, the parallel connection of multiple process groups is synergetic, and may be also be realised more or less compared with the four process groups 100a to 100d shown in FIGS. 8a to 8c. The person skilled in the art may configure the process system according to the needs of the specific case.

In summary, it is preferred if a controller is provided for multiple process groups connected in parallel, to cause a temperature wave W to pass through the process unit in each process group and back again cyclically, and wherein the controller is designed to cause the temperature waves of the groups to run through the groups and back at the same frequency but with a phase shift, preferably with substantially the same phase shift each.

It should be noted here that the person skilled in the art is able to select the configuration for each specific case so as to ensure that some of the waves $W_a$ to $W_d$ are already returning while other waves $W_a$ to $W_d$ are still moving forwards wherein, as described earlier, it is favourable but not essential for the waves W to have the same frequency.

In summary, a method is created in which process groups, each of which includes a process unit arranged between two assigned heat storages, are interconnected via a conduit arrangement (L), and wherein the process groups in turn are connected parallel to each other via the conduit arrangement (L), and the heat storages in each process group are driven with a wavelike temperature stratification, which forms a wave W that moves according to a direction of flow of heat transporting medium through the process group thereof, in this context a change of the flow direction is also clocked for each of the parallel-connected process groups in such manner that the waves W of the process groups are constantly running back and forth in oscillating manner through the process unit of the group.

This method is preferably designed for the cyclical heating and cooling of multiple process units which are operable between an upper ($T_O$) and a lower temperature ($T_U$), wherein at least two process units are heated and then cooled again in phase offset manner, wherein the process units are heated from a heat storage assigned to each of them, and heat given off during the cooling is delivered to a heat storage assigned to each of them. PA 14: More preferably, the at least two process units are heated and cooled at the same frequency. PA 14: In particular, the phase offset may be realised such that heat originating from an additional heat source is taken with a substantially regular clock and can be introduced into the cycle of heating and cooling the multiple process units.

FIG. 9 shows a combined process group 160 of a preferred embodiment of the present invention. The figure shows a first 161 and a second process unit 162, which are again embodied as cerium reactors (although process units of a different design may also be provided). Also shown are a front 163, a middle 164 and a rear heat storage 165, which are embodied as stratified heat storage. In such manner that a temperature distribution may be realised in them, so that a temperature wave $W_K$ forms, see the descriptions associated with FIGS. 3 to 5. A heat transporting fluid is able to flow through the length of the arrangement from an alternating configuration of series-connected heat storages 162 to 165 and process units 161, 162 (which form the combined process group) through an arrangement of line ports 166a, 166b of a conduit arrangement L therefor, wherein a controller—omitted from the figure for the sake of clarity—is able to connect the conduit arrangement L in such manner that the fluid flows through the combined process group 160 in alternating cycles from line port 166a to line port 166b (to the right in the figure) and from line port 166b to line port 166a (to the left in the figure) in alternating cycles.

Consequently, in all of the embodiments represented here the heat storages are preferably designed to accept and give off heat in a wavelike temperature profile, preferably being constructed as stratified heat storages. PA 4: Moreover, a process system according to the present invention preferably includes a combined process group in which at least two process units and at least three heat storages are provided, which are connected to each other alternatingly in series by the conduit arrangement (L) in such manner that two process units enclose a one heat storage between them, as is the case for the process units 161, 162 enclosing heat storage 164. In addition, as is the case of the embodiment shown in the figure, process system according to claim 4, wherein the process units connected in series with heat storages are themselves each positioned between two heat storages, such that a heat storage is positioned at each end of the combined process unit.

Diagram 170 shows the temperature distribution in the combined process group 160 after a startup operation as reflected in the temperature distribution curve 171 at time $t_0$. Wave $W_K$ extends from the inlet to the first heat storage 163 as far as the middle of the third heat storage 165 and consists of a rising edge 171a in heat storage 163, an upper falling edge 171c In heat storage 164 and a lower falling edge 171e in heat storage 165, where it runs out at its half length at ambient temperature $T_{UG}$. During the startup operation, the wave $W_K$ which is formed and passes from left to right through process group 160 warms both reactors 161, 162, the first reactor 161 to $T_o$, the second reactor 162 to $T_U$. Again, the temperature of wave $W_K$ falls over the length of the reactors or process units 161, 162 respectively, in reactor 161, where the wave crest is located, from the edge temperature $T_{FO}$ to $T_O$ in reactor 162, from the edge temperature $T_{FU}$ to $T_U$, see the gently falling areas 171b and 171d of wave $W_K$.

With the startup operation, a temperature of the wave $T_{FO}>T_O$ can be created easily—but during operation of the combined process group it is necessary to supply external heat to achieve temperatures $>T_R$ similarly to the case of the simple process group Illustrated in FIGS. 1 to 8d, particularly FIGS. 8b and 8c, see the description of diagram 173 below.

After the startup operation, wave $W_K$ is thus in its left end position at time $t_1$. Then, the controller switches the conduit arrangement L so that heat transporting fluid flows to the right through the combined process group as shown by the arrow in diagram 170, so that wave $W_K$ moves to the right.

Diagram 173 shows the temperature distribution in the combined process group 160 as reflected in the temperature distribution curve 174 at time $t_r$, that is to say as soon as wave $W_K$ is in its right end position due to the flow of heat transporting medium to the right. The rising edge has passed halfway through reactor 161, and accordingly cooled it from $T_o$ to $T_{KE}$ (see FIG. 2). The lower half 174a of the rising edge is still in heat storage 163, and the upper half 174c of the rising edge is already in heat storage 164, the edge halves being separated by a gently rising area 174b, since the cooling rising edge has taken up heat from the reactor 161 as it passes through it. Reactor 161 has accordingly been cooled by wave $W_K$, the corresponding heat is now in edge 174c.

At the same time, the falling edge 174e of wave $W_K$ has passed through the second reactor 162 and into the third heat storage 165, so that the wave crest is now in the second reactor 162, and has heated it to the upper temperature $T_{FO}$ due to the upper edge temperature.

As was noted earlier with reference to FIG. 2, without the supply of external heat the upper edge temperature $T_{FO}$ of edge 174c would lie below the recovery temperature $T_R$, which is below the upper reactor temperature $T_O$, and thus also below the upper edge temperature $T_{FO}$, which is essential in order to create $T_O$ in the reactor. Therefore, heat from an external source 111 is preferably also supplied to the combined process group 160 shown, wherein this supply of heat may take place in the heat storage 164 or in the second reactor 162. The person skilled in the art is easily able to adapt this heat supply to the specific situation using the present description, so that in this case a corresponding fifth section V of the conduit arrangement L is only suggested by the line port 175 to the heat storage 164.

It should also be noted that this supply of heat from an external heat source 111 may generally also take place directly in one of the process units or in one or more of the heat storages—this applies for all embodiments according to the Invention.

Consequently, a supply line for the heat transporting medium is provided, which opens into one or more of the heat storages and/or process units, and this in turn is connected to a further heat source, which preferably delivers heat at a temperature of $T_O$ or higher.

After the wave $W_K$ has reached its right end position at time $t_r$, the controller switches the conduit arrangement L in such manner that the wave $W_K$ begins moving back to the left (wherein it is also possible to provide for a short period of time during which the wave $W_K$ remains stationary at its right end position).

Diagram 176 shows the temperature distribution in combined process group 160 as reflected in the temperature distribution curve 177 at time $t_l$, in which the wave is located in its left end position in normal operation. The upper part 177a of the rising edge has heated the first reactor 161 as it passed through, the upper part 177c of the falling edge has cooled the second reactor 162 as it passed through, so that the tip of the wave would be at recovery temperature $T_R$ without the supply of external energy from heat source 111. In diagram 176, however, the tip of the wave has temperature $T_{FO}$, which is greater than upper temperature $T_O$, wherein the heat required for this has been supplied from heat source 111 via line port 175.

After the wave has reached its left end position, a cycle consisting of a movement to the right (cooling of the first reactor 161 and heating of the second reactor 162) and a movement to the left (heating of the first reactor 161 and cooling of the second reactor 162) is complete. This cycle is repeated for as long as the reactors 161, 162 are intended to run.

In summary, the conduit arrangement (L) has a first switching state, in which heat transporting medium flows through the combined process group in one direction, and a second switching state, in which heat transporting medium flows through the combined process group in the opposite direction, wherein a control is provided to switch the conduit arrangement (L) back and forth cyclically between the first and the second switching states during operation. PA 10: In this context, the control is preferably further designed to cause a temperature wave to pass cyclically back and forth inside the combined process group and along the entire length thereof in operation.

For the combined process group as well (as also for the simple process group), in summary there is a method in which in order to cool a process unit a heat storage assigned thereto is discharged, releasing thereby heat in the range of the upper temperature ($T_O$) into the process unit, this heat falls towards the lower temperature ($T_U$) due to the discharge, and wherein in order to heat a process unit a heat storage assigned to it releases heat to the process unit in the range of the lower temperature (TU), whereby this heat increases towards the upper temperature (TO) as the process unit is being heated.

The method in the case of a combined process group is also preferably designed such that the process units and the associated heat storages are switched in series with each other alternatingly by a conduit arrangement (L), and the heat storages are operated with a wave-shaped temperature stratification which forms a wave $W_K$ that moves through the heat storages and the process groups according to a flow direction of a heat transporting medium, and further that a change of the flow direction through the heat storages and process groups is docked such that the wave WK runs constantly back and forth in an oscillating motion through all process units of the combined process group.

The combined process group 160 offers considerable advantages over a simple process group, since less stored heat is required relative to the process unit and consequently to production, and the controller of the conduit arrangement L is omitted for purposes of simplicity, so that the process units 161, 162 may be operated more efficiently:

The minimum necessary total length of the heat storages 163, 164, 165 used in the process group 160 corresponds to five quarters of the length of wave $W_K$, that is to say five eighths of the length of wave $W_K$ per process unit. If the wave is in the left end position, the heat storage 163 must absorb the whole of the rising edge 171a, see diagram 170. If the wave $W_K$ is in the right end position, the heat storage 165 must be able to absorb the whole of the falling edge 174e, see diagram 173, wherein a full edge corresponds to half the length of wave $W_K$. Heat storage 164 must be able to absorb about half an edge, see diagrams 170, 173 and 176, which is equal to a quarter of the length of wave $W_K$. Accordingly, in a process system with a combined process group a heat storage surrounded by the process units preferably has a length in the range of a quarter of a temperature wave W, PA 8: and more preferably that the heat storages located at each end of the combined process unit have a length in the range of half a temperature wave.

The minimum necessary total length of the heat storages 61, 62 used in the process group 63 in asymmetrical operation corresponds to five quarters of the length of wave $W_K$, that is to say five eighths of the length of wave $W_K$ per process unit. If the wave W is in the left end position, the heat storage 61 must be able to absorb three quarters of a wave, see diagram 85. If the wave W is in the right position, the heat storage 62 must be able to absorb a full edge, I.e., half of the wave W, altogether five quarters for Just one process unit 63.

In other words, the arrangement of heat storages and process units in a combined process group 160, that is to say in an arrangement with two process units does not create a need for heat storages of greater length (or capacity) than an arrangement with Just one process unit, but production is doubled.

This also reduces the complexity of the conduit arrangement L, and therewith of the controller too, since there are still only two cold sides on heat storages for two process units, as is the case with one process unit.

It should be noted here that the conditions and advantages described in connection with the simple process group (FIGS. 1 to 7*d*) may also be applied to the combined process group as illustrated in FIGS. 8 to 11. These particularly include, but are not limited to, the cold sides of the heat storages adjacent to the combined process group (which are operated at die auf $T_{ug}$ or higher), a warm zone without any switching elements, symmetrical or asymmetrical operation, parallel connection of multiple combined process groups, for simpler supply of additional, external heat for example, coordination of the flow velocity for a predetermined temperature difference relative to the cerium reactor etc.

FIG. 10 shows a schematic view of a combined process group 180 with three process units, specifically a first process unit 181, a second process unit 182 and a third process unit 183, which are connected in series in alternating manner with associated heat storages 181 to 183.

The temperature distribution in process group 180 after a startup operation corresponds to the temperature distribution curve 186 plotted directly in the heat storages 181 to 183 and process units 184 to 185 (wherein the sections passing through the process units 184, 185 are represented by dashed lines).

Again, two line ports 188, 189 of a section II of the conduit arrangement L are present, through which heat transporting fluid can flow through the length of the process group 180 while the combined process group 180 is in operation, and again a control for the process group 180 and gas tanks for $O_2$ and $H_2O$ (see FIG. 1) have been omitted to ensure the figure is easily understandable. Second section II of the conduit arrangement L also connects the cold sites of the first 181 and third 183 heat storages.

The temperature distribution curve 186 has a sawtooth shape, unlike the substantially symmetrical, for example sinusoidal shape in the preceding figures, with the result that a wave $W_s$ has several wave tips, and consequently that when the W shifts to the right the process units 184, 185 are heated simultaneously, and when it shifts to the left they are cooled simultaneously.

At this point, it should be noted that the temperature distribution curves can also be torn apart, as is the case for example in the process units. Thus for example it is conceivable to separate a functionally unitary heat storage into two parts with a line section, and so torn apart a temperature edge. Such separations are not considered here when the shape of a wave W, $W_a$-$W_d$ or $W_K$ (symmetrical, asymmetrical, sinusoidal, sawtooth etc.) is discussed, since the temperatures desired in the process units have nothing to do with the type and arrangement of the separations in and of themselves.

A sixth section VI of the conduit arrangement L preferably has branched lines 187, 188 which open into the heat storages 181 to 183 at the ends thereof (in an embodiment which is not illustrated they can also open into the process units 184, 185). This makes it possible to generate the desired temperature stratification in each of the heat storages for the startup operation, which may be advantageous particularly with a wave that has a steep edge (for example the sawtooth wave shown here). Unlike the proper operation of process unit 180, in which the shift of the wave is only slight, in a startup operation that takes place through lines 188, 189 the wave segment created first must pass through the entire arrangement, which can result in an undesirable flattening of this first wave segment. With the sixth section VI of the conduit arrangement L, the heat transporting medium is able to flow through every single heat storage 181 to 183 individually during the startup operation, so that the desired heat distribution and temperature stratification is formed precisely in each heat storage 181 to 183. Moreover, heat from a further, external heat source may also be supplied via the sixth section VI to create temperatures above $T_R$ in the process units 184, 185 (see FIG. 2).

As a result, the conduit arrangement L has a sixth section VI, of which the lines are connected to each of the heat storages and/or each of the process units for operating purposes, wherein a controller is designed to charge the connected heat storages and/or process units with a predefined heat via the sixth section VI in a third switching state of the conduit arrangement L in such manner that a predetermined temperature distribution in the form of a wave W, $W_a$-$W_d$ or $W_K$ is created in each of the process groups.

FIG. 11 shows a process unit 190 having more than two process units 191 to 193 and more than three heat storages 194 to 198. The difference between this and the arrangement of FIG. 10 lies in the number of process units—the figure shows that in the Illustrated embodiment with the sawtooth arrangement of wave W, the number of heat storages provided in a combined process group is theoretically unlimited. Accordingly, the temperature distribution curve 199 has three wave crests instead of the two shown in FIG. 10.

In summary, FIG. 11 shows a process system in which three process units are connected alternatingly in series with five heat storages via the conduit arrangement (L) in such in such a way that two process units enclose a heat accumulator between them.

The embodiments described above reveal a process system according to the invention with heat storages that are designed to storage heat between an upper ($T_O$) and a lower temperature ($T_U$) and to release it again, and comprise a conduit arrangement (L) for bringing the heat transporting medium to the heat storages and away from them again, wherein multiple process units that are operable between the upper ($T_O$) and the lower temperature ($T_U$) are provided, and are each operatively arranged between two heat storages by the conduit arrangement (L).

At the same time, a method is disclosed for cyclically heating and cooling a plurality of process units, which are operable between an upper ($T_O$) and a lower temperature ($T_U$), wherein preferably at least two process units are heated and cooled again with a phase shift between them, wherein the process units are heated from a heat storage assigned to each of them, and give off the heat released by them during cooling to a heat storage assigned to them.

The invention claimed is:

1. A process system comprising:
a reactor as a process unit and a plurality of heat storages, which are designed to store heat between a same upper ($T_o$) and a lower process temperature ($T_U$) of the reactor and to discharge the same again, and comprising a conduit arrangement (L) for the transport of heat transporting medium to the heat storages and away from them again, wherein a plurality of reactors that are operable between the same upper ($T_O$) and a lower process temperature ($T_U$) are provided relating to a first and a second chemical process, and are each operatively arranged between two of the individual heat storages through the conduit arrangement (L), wherein each of the individual heat storages having a reactor operatively arranged between them and each of the individual heat storages is designed to accept heat with a wavelike temperature profile over time and through the length of individual heat storages and the reactor operatively arranged between them, and also to discharge heat continuously varying from the same upper ($T_O$) to the lower process temperature ($T_U$) and back to the upper process temperature (To) with the wavelike temperature profile over time and through the length of individual heat storages and the reactor operatively arranged between them.

2. The process system according to claim 1, wherein a feed line for the heat transporting medium is provided, and opens into one or more of the heat storages and/or process units, which in turn is connected to a further heat source, which delivers heat at a temperature of $T_O$ or higher.

3. The process system according to claim 1, wherein the heat storages are stratified heat storages and are designed to accept and discharge heat with a wavelike temperature profile.

4. The process system according to claim 3, wherein the heat storages located at the ends of a combined process group have a length half a temperature wave $W_K$.

5. The process system according to claim 3, wherein a control is provided to cause a temperature wave $W_a$-$W_d$ to pass cyclically back and forth through the process unit in each process group, and wherein the control is designed for causing the temperature waves $W_a$-$W_d$ of the process groups to run back and forth at the same frequency but with a phase shift with respect to each other with substantially the same phase shift.

6. The process system according to claim 1, wherein the system comprises a combined process group in which at least two process units and at least three heat storages are provided, which are connected to each other alternatingly in series by the conduit arrangement (L) in such manner that two process units enclose a one heat storage between them.

7. The process system according to claim 6, wherein three process units are connected with four heat storages alternatingly in series by the conduit arrangement (L) in such manner that two process units each enclose a one heat storage.

8. The process system according to claim 6, wherein the enclosed heat storages have a length in the range of a quarter of a temperature wave WK.

9. The process system according to claim 6, wherein the process units connected in series with heat storages each lying for their part between two heat storages, in such manner that one heat storage is located at each of the two ends of a combined process group.

10. The process system according to claim 9, wherein a control is designed to cause a temperature wave to run back and forth cyclically over the entire length of the combined process group during operation.

11. The process system according to claim 6, wherein during operation the conduit arrangement (L) has a first switching state, in which heat transporting medium in flows through the combined process group in one direction, and a second switching state in which heat transporting medium flows through the combined process group in the opposite direction, and wherein a control is provided to switch the conduit arrangement (L) cyclically back and forth between the first and the second switching states during operation.

12. The process system according to claim 1, wherein multiple simple process groups, each including a process unit and two heat storages enclosing said process unit between them are connected in parallel by the conduit arrangement (L), and wherein the heat storages have a cold and a warm side in operation, the warm sides of the heat storages of each process group are connected to the associated process unit via the conduit arrangement (L) and the cold sides are interconnected to other cold sides across the groups.

13. The process system according to claim 1, wherein in operation the heat storages of a simple or of a combined process group have a temperature distribution which corresponds to a substantially symmetrical temperature wave ($W, W_a$-$W_a, W_K$).

14. The process system according to claim 1, wherein in operation the heat storages of a simple or of a combined process group (160,180,190) have a temperature distribution which corresponds to a substantially asymmetrical temperature wave ($W, W_a$-$W_a, W_K$), in the form of sawtooth.

15. A method for cyclically heating and cooling the process system of claim 1, the process system comprising a plurality of process units embodied as a reactor each of which is operated between a same upper ($T_O$) and a same lower process temperature ($T_U$), wherein at least two reactors are heated and cooled again with a phase shift between them, wherein the reactors are each heated from an individual heat storage assigned to them, and heat that is emitted from them during cooling is transferred to an individual heat storage assigned to them, wherein in order to cool a process unit an individual heat storage assigned to it is discharged, thereby giving heat in the temperature range of the upper temperature ($T_O$) into the process unit, the temperature of this heat as continuously discharged from the heat storage continuously falling during discharge to the range of the lower process temperature ($T_U$), and wherein in order to heat a process unit an individual heat storage assigned thereto releases this heat with a temperature in the range of the lower temperature ($T_U$), and this heat as continuously released from the heat storage continuously increasing during discharge to the range of the upper temperature ($T_O$) during warming of the process unit.

16. The method according to claim 15, wherein the at least two process units are heated and cooled again with the same frequency.

17. The method according to claim 15, wherein the phase shift is created in such manner that heat originating from a further heat source is taken from said source in a substantially regular time interval and can be introduced into the cycle of heating and cooling the multiple process units.

18. The method according to claim 15, wherein process units and the heat storages assigned to them are connected to each other alternatingly in series by a conduit arrangement (L), and the heat storages are operated with a wave-shaped temperature stratification which forms a wave $W_K$, which advances through the heat storages and process units according to a direction of flow of heat transporting medium, and that furthermore a change in the direction of flow through the heat storages and process units is clocked in such manner that the wave WK constantly oscillating back and forth, runs through at least part of all process units.

19. The method according to claim 15, wherein process groups are connected via a conduit arrangement (L), each process group comprising a process unit arrange between two associated heat storages, and wherein the process groups in turn are connected to each other in parallel via the conduit arrangement (L), the heat storages in each process group being operated with a wavelike temperature stratification that forms a wave $W_a$-$W_d$, which passes according to a direction of flow of heat transporting medium through its process group, and further a change in the direction of flow is timed for each of the process groups connected in parallel in such manner that the waves Wa-Wa of the process groups continuously pass back and forth in oscillating manner through the process unit of the group.

* * * * *